US008677856B2

(12) United States Patent
Okada et al.

(10) Patent No.: US 8,677,856 B2
(45) Date of Patent: Mar. 25, 2014

(54) STEERING DEVICE

(75) Inventors: Shinji Okada, Maebashi (JP); Yuuichi Tomaru, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/265,430

(22) PCT Filed: Jul. 14, 2011

(86) PCT No.: PCT/JP2011/066051
§ 371 (c)(1),
(2), (4) Date: Jul. 11, 2012

(87) PCT Pub. No.: WO2012/011424
PCT Pub. Date: Jan. 26, 2012

(65) Prior Publication Data
US 2012/0266715 A1    Oct. 25, 2012

(30) Foreign Application Priority Data

Jul. 21, 2010    (JP) ................................. 2010-163545
Jul. 21, 2010    (JP) ................................. 2010-163574
Apr. 4, 2011    (JP) ................................. 2011-082762

(51) Int. Cl.
*B62D 1/18*    (2006.01)
(52) U.S. Cl.
USPC ........................................... 74/493; 280/775
(58) Field of Classification Search
USPC ..................................... 74/492, 493; 280/775
See application file for complete search history.

(56) References Cited

U.S. PATENT DOCUMENTS

| 5,301,567 | A * | 4/1994 | Snell et al. ..................... 74/493 |
| 7,717,011 | B2 * | 5/2010 | Hirooka .......................... 74/493 |
| 2004/0061322 | A1 * | 4/2004 | D'Agostino et al. .......... 280/775 |
| 2009/0241721 | A1 | 10/2009 | Inoue et al. |
| 2009/0267336 | A1 * | 10/2009 | Streng et al. .................. 280/775 |
| 2009/0272219 | A1 | 11/2009 | Okada et al. |

FOREIGN PATENT DOCUMENTS

| JP | 2008-137393 A | 6/2008 |
| JP | 2008-307959 A | 12/2008 |
| JP | 2009-29224 A | 2/2009 |
| JP | 2009-227181 A | 10/2009 |

OTHER PUBLICATIONS

International Search Report dated Sep. 13, 2011 (one (1) page).

* cited by examiner

*Primary Examiner* — Justin Krause
(74) *Attorney, Agent, or Firm* — Crowell & Moring LLP

(57) ABSTRACT

A steering device facilitates assembly of a tilt lock mechanism, which elastically supports movement of a movable tilt lock gear to a stationary cam in a tilt direction via a spring. When a cylindrical part of a tilt stopper is inserted into a through hole, the cylindrical part enlarges in diameter, and surfaces of engagement projections engage with an end surface of an inclined cam surface side of the stationary cam. A right end surface of a tilt stopper flange part abuts against an end surface of the movable tilt lock gear. The movable tilt lock gear, a wire spring, and the stationary cam are integrated by the tilt stopper, and are prevented from being dispersed during transport. As a result, the assembly time can be reduced.

5 Claims, 21 Drawing Sheets

FIG. 7
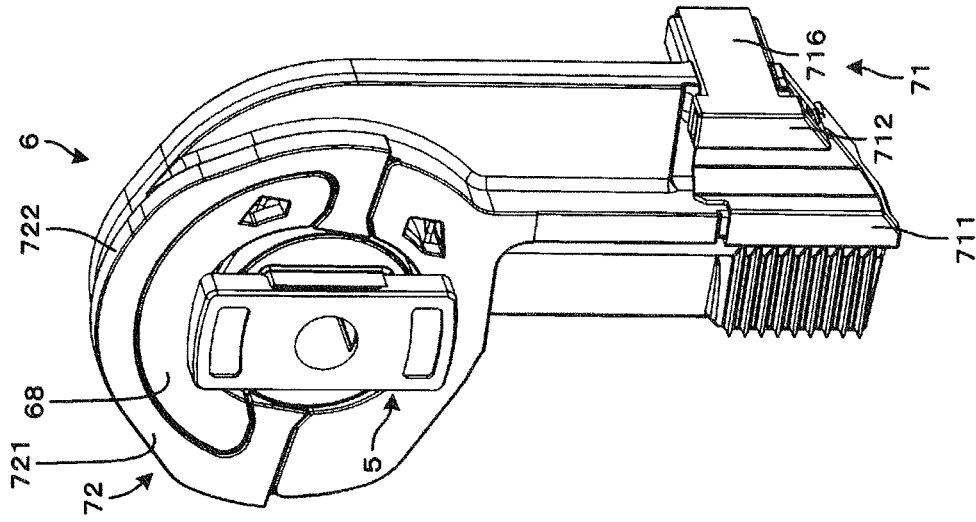
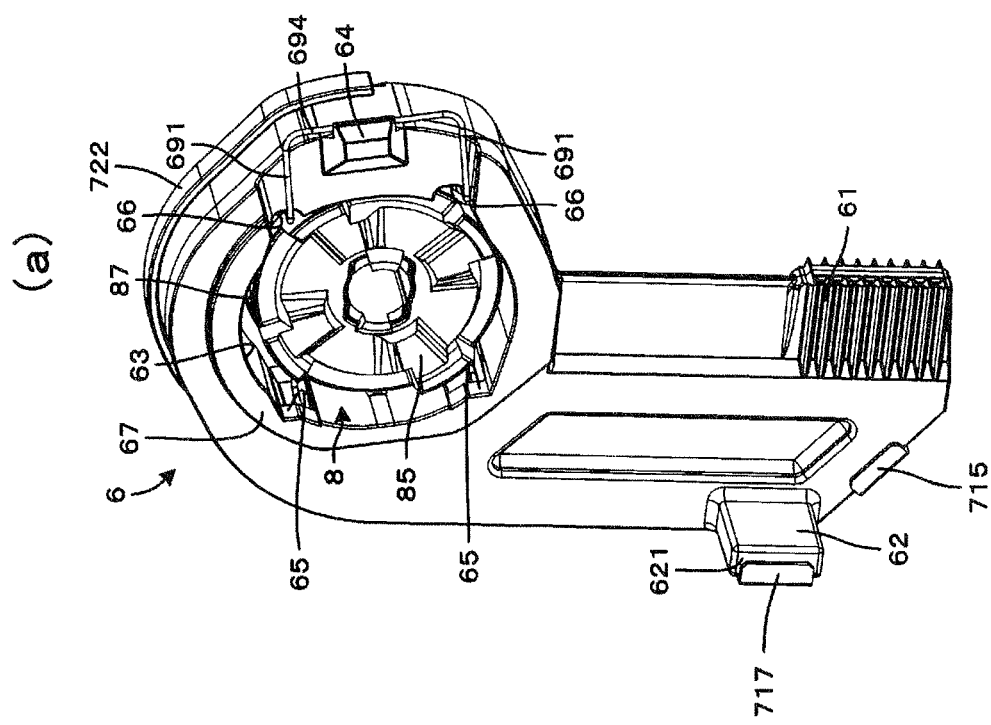

Fig. 12
(a) 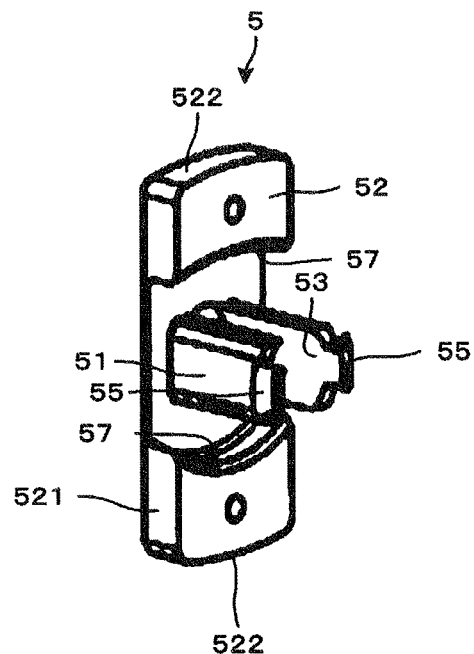
(b) 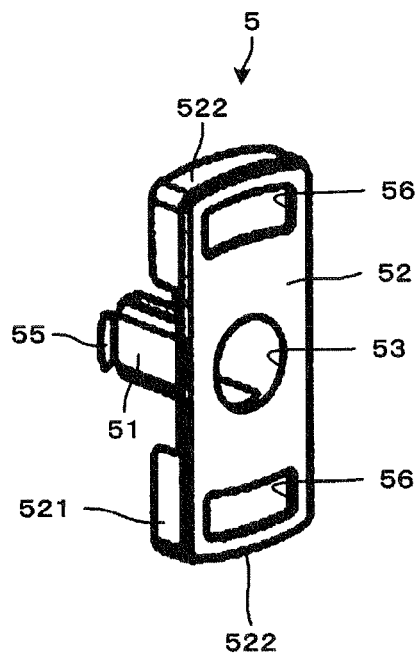

FIG. 13
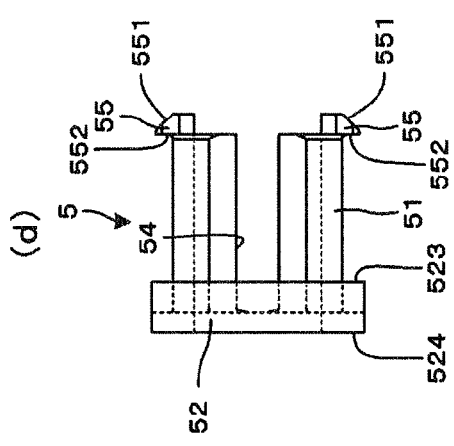
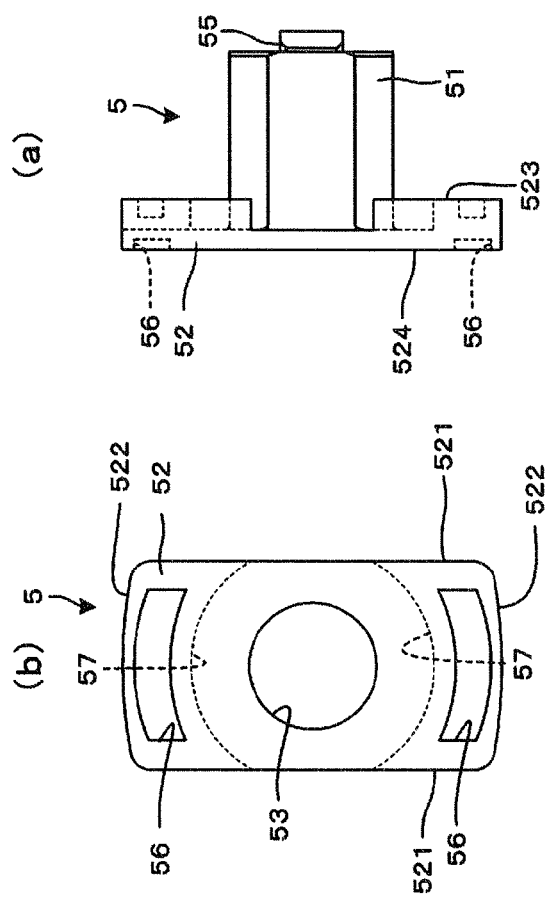

Fig. 16
(a)
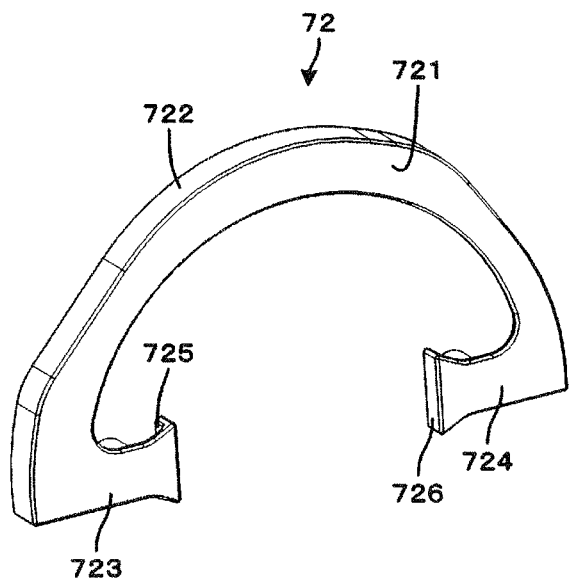
(b)
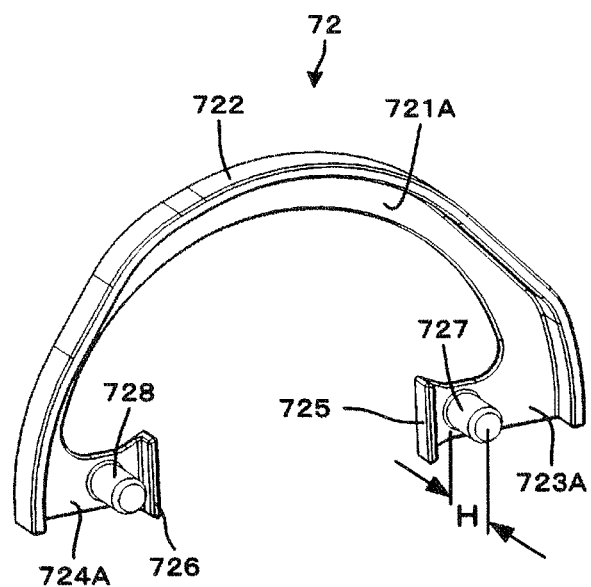

Fig. 18
(a) 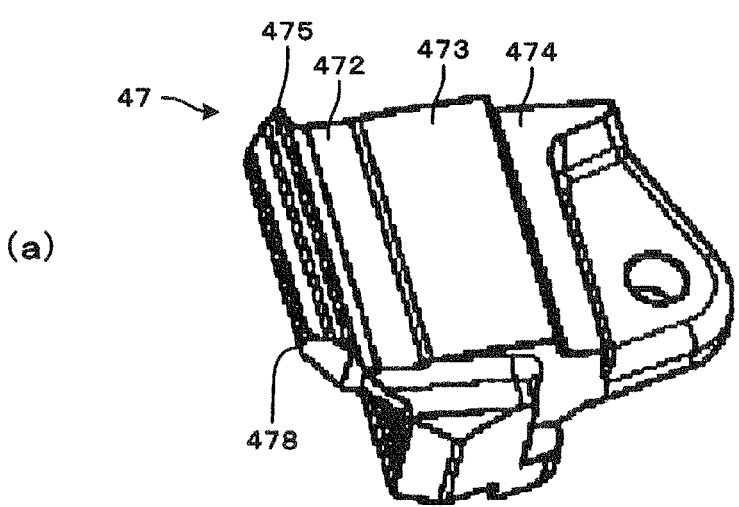
(b) 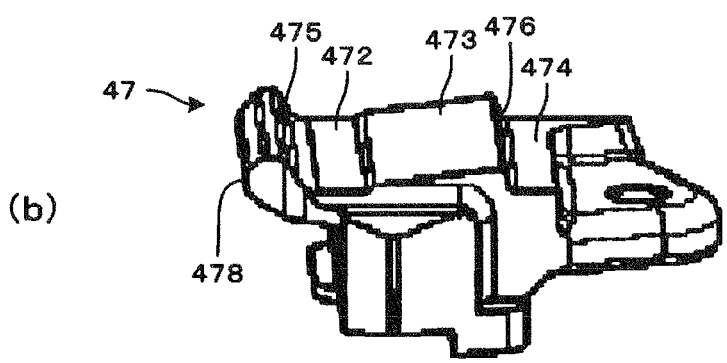

STEERING DEVICE

CROSS REFERENCES TO RELATED APPLICATIONS

This application contains subject matter related to U.S. application Ser. Nos. 13/265,440, and 13/265,451 entitled "Steering Device," and "Steering Device," all filed on even date herewith.

TECHNICAL FIELD

The present invention relates to a steering device, and more particularly to a steering device of a tilt type or a tilt and telescopic type combining a telescopic type with the tilt type in which a tilt position of a steering wheel can be adjusted according to a body type or a driving posture of a driver.

BACKGROUND ART

A tilt position adjustment mechanism is a mechanism for adjusting an inclination angle of the steering wheel to the best driving position according to the body type or preference of the driver. In adjusting the inclination angle of the steering wheel, after the inclination angle of the steering wheel is adjusted steplessly in a state where a tilt clamp mechanism is unclamped once, the tilt clamp mechanism is again clamped.

In the steering device having the steering position adjustment mechanism of this type, a vehicle body attachment bracket is fixed to a vehicle body, and a fastening rod is allowed to insert into a tilt adjustment slender groove and a column of the vehicle body attachment bracket. During tilt clamping, a stationary cam is pressed in an axial direction by a movable cam that rotates due to the operation of an operating lever to fasten the fastening rod, and the column is pressed toward the vehicle body attachment bracket for clamping.

The stationary cam has a cam surface for relatively pressing the movable cam toward the stationary cam in the axial direction, and a locking unit for disabling the stationary cam to be relatively rotated with respect to the movable cam, and for sliding along the tilt adjustment slender groove at the time of adjusting the tilt position. Accordingly, the stationary cam requires both characteristics of durability for allowing a cam surface to withstand a large clamp force, and an impact reduction capability for reducing an impact sound when the locking unit is abutted against the tilt adjustment slender groove at an adjustment end of the tilt position.

The stationary cam of the steering device disclosed in Patent document 1 integrally couples two parts consisting of a cam member having a cam surface made of a high-hardness material and a locking unit made of a synthetic resin to provide those characteristics described above.

Also, in the steering device having the steering position adjustment mechanism of this type, when the fastening force of the fastening rod is lax, the column is caused to move in a tilt direction during a secondary collision where a driver collides with the steering wheel, resulting in a risk that an air bag disposed in the steering wheel cannot accept an occupant at an effective position.

As a mechanism for blocking the movement of the column during this secondary collision, there is a tilt lock mechanism in which a stationary tilt lock gear is disposed on the vehicle body attachment bracket side, and a movable tilt lock gear the is engaged with the stationary tilt lock gear is inserted into the fastening rod.

With this configuration, during the tilt locking, the fastening rod is fastened to engage the movable tilt lock gear with the stationary tilt lock gear, thereby improving a retention force in the tilt direction, with the result that even if an impact load due to the secondary collision is exerted on the steering wheel, the column is not moved in the tilt direction.

In the above steering device that enables the tilt position to be adjusted steplessly, when the fastening rod is fastened to engage the movable tilt lock gear with the stationary tilt lock gear during tilt locking, the respective threads of the movable tilt lock gear and the stationary tilt lock gear may be abutted against each other depending on the tilt position, thereby disabling normal engagement. When the respective threads of the movable tilt lock gear and the stationary tilt lock gear are abutted against each other, the tilt lock becomes insufficient, and when the fastening rod is forcedly fastened, the movable tilt lock gear and the stationary tilt lock gear are strongly rubbed with each other, thereby causing discomfort for the driver.

In order to prevent the respective threads of the movable tilt lock gear and the stationary tilt lock gear from being abutted against each other, there is a need that the movable tilt lock gear is movably fitted onto the stationary cam in the tilt direction, and the movement of the movable tilt lock gear in the tilt direction with respect to the stationary cam is elastically supported by a spring to provide the degree of freedom of a position at which the movable tilt lock gear and the stationary tilt lock gear are engaged with each other.

However, in a structure in which the spring provides the degree of freedom of the position at which the movable tilt lock gear and the stationary tilt lock gear are engaged with each other, because the structure is complicated, and the number of parts increases, a structure easy in assembling is required.

PRIOR ART DOCUMENT

Patent Document

Patent Document 1: Japanese Unexamined Patent Application Publication No. 2008-307959

SUMMARY OF THE INVENTION

Problem to be Solved by the Invention

The present invention aims at providing a steering device that facilitates the assembling of a tilt lock mechanism that elastically supports the movement of a movable tilt lock gear with respect to a stationary cam in a tilt direction by the aid of a spring, and also provides the stationary cam having both characteristics of the durability and the impact reduction capability.

Means for Solving the Problem

The above problem is solved by the following means. That is, according to a first aspect of the present invention, there is provided a steering device, comprising: a vehicle body attachment bracket that can be attached to a vehicle body; a column that is supported by the vehicle body attachment bracket so that a tilt position is adjustable, and rotatably pivotally supports a steering shaft equipped with a steering wheel; a fastening rod that is inserted into a tilt adjustment slender groove formed in the vehicle body attachment bracket and the column in order to fasten the column to the vehicle body attachment bracket at a desired tilt position; a stationary cam that is supported by one end of the fastening rod, and presses one side of the vehicle body attachment bracket toward the column; a movable cam that is rotatably supported by one end of the fastening rod together with an operating lever so as to face the stationary cam; a cam surface that is disposed on respective surfaces that face the stationary cam and the movable cam, and presses the movable cam toward the stationary cam relatively in an axial direction; a locking unit that is formed in the stationary cam in order to disable the stationary cam to be relatively rotated with respect to the movable cam, fitted into the tilt adjustment slender groove, and can slide along the tilt adjustment slender groove when adjusting the tilt position of the column; a stationary tilt lock gear formed on one side of the vehicle body attachment bracket; a movable tilt lock gear that rotates in synchronism with rotating operation of the operating lever, can be engaged with the stationary tile lock gear, and is fitted onto the stationary cam so as to be movable in a tilt direction; a spring that is inserted between the movable tilt lock gear and the stationary cam, and elastically supports movement of the movable tilt lock gear to the stationary cam in the tilt direction; and a tilt stopper that holds the stationary cam, the movable tilt lock gear, and the spring integrally.

According to a second aspect of the present invention, in the steering device of the first aspect of the present invention, the tilt stopper is fitted into the tilt adjustment slender groove, is slidable along the tilt adjustment slender groove when adjusting the tilt position of the column, and abuts against an end of the tilt adjustment slender groove at the tilt adjustment end to reduce an impact.

According to a third aspect of the present invention, in the steering device according to the second aspect of the present invention, the tilt stopper comprises: a flange that is fitted into the tilt adjustment slender groove, and is slidable along the tilt adjustment slender groove when adjusting the tilt position of the column; and a space part that is formed in the vicinity of an end surface of the flange in the tilt adjustment direction, and reduces the impact when the flange is abutted against the tilt adjustment end of the tilt adjustment slender groove.

According to a fourth aspect of the present invention, in the steering device according to the third aspect of the present invention, the tilt stopper comprises: a cylinder part that is formed integrally with the flange, and fitted into a through hole formed in an axial core of the stationary cam; an engagement projection that is formed on an end of the cylindrical part, projects outwardly from an outer peripheral surface of the cylindrical part in a radial direction thereof, and is engageable with an end surface of a cam surface side of the stationary cam; and a through hole that is formed in the axial core of the cylindrical part, into which the fastening rod is inserted, in which the stationary cam, the movable tilt lock gear, and the spring are held between the end surface of the flange and the engagement projection integrally.

According to a fifth aspect of the present invention, in the steering device according to the first aspect of the present invention, the tilt stopper is symmetric with respect to a line that passes through the center of the tilt stopper as the axis of symmetry.

Advantages of the Invention

The steering device according to the present invention includes the stationary tilt lock gear formed on one side of the vehicle body attachment bracket, the movable tilt lock gear that rotates in synchronism with rotating operation of the operating lever, can be engaged with the stationary tile lock gear, and is fitted onto the stationary cam so as to be movable in a tilt direction, the spring that is inserted between the movable tilt lock gear and the stationary cam, and elastically supports movement of the movable tilt lock gear to the stationary cam in the tilt direction, and the tilt stopper that holds the stationary cam, the movable tilt lock gear, and the spring integrally. Also, the tilt stopper is fitted into the tilt adjustment slender groove, is slidable along the tilt adjustment slender groove when adjusting the tilt position of the column, and abuts against an end of the tilt adjustment slender groove at the tilt adjustment end to reduce the impact.

Accordingly, because the stationary cam, the movable tilt lock gear, and the spring can be integrally held by the tilt stopper, those parts can be dealt with as one part, and the assembling time can be reduced. Also, because the tilt stopper and the stationary cam are configured by separate parts, it is easy to provide both characteristics of the durability and the impact reduction capability.

BRIEF DESCRIPTION OF THE DRAWINGS

FIG. 7 illustrates a state in which a movable tilt lock gear, a stationary cam, and a wire spring are assembled integrally by a tilt stopper, in which FIG. 7(*a*) is a perspective view taken from an inclined cam surface side of the stationary cam, and FIG. 7(*b*) is a perspective view taken from a rear side of FIG. 7(*a*).

FIG. 12 is a perspective view illustrating a tilt stopper alone, in which FIG. 12(*a*) is a perspective view of the tilt stopper taken from an engagement projection side, and FIG. 12(b) is a perspective view of the tilt stopper taken from a flange side.

FIG. 13 is a part view illustrating the tilt stopper alone, in which FIG. 13(a) is a front view of the tilt stopper, FIG. 13(b) is a left side view of FIG. 13(a), FIG. 13(c) is a right side view of FIG. 13(a), and FIG. 13(d) is a plan view of FIG. 13(a).

FIG. 14 is a perspective view illustrating a first buffer member alone, in which FIG. 14(a) is a perspective view of the first buffer member taken from a slide surface side, and FIG. 14(b) is a perspective view of the first buffer member taken from a rear surface of the slide surface.

FIG. 15 is a part view illustrating the first buffer member alone, in which FIG. 15(a) is a front view of the first buffer member, FIG. 15(b) is a left side view of FIG. 15(a), FIG. 15(c) is a right side view of FIG. 15(a), and FIG. 15(d) is a right side view of FIG. 15(c).

FIG. 16 is a perspective view illustrating a second buffer member alone, in which FIG. 16(a) is a perspective view of the second buffer member taken from a slide surface side, and FIG. 16(b) is a perspective view of the second buffer member taken from a rear surface of the slide surface.

FIG. 17 is a part view illustrating the second buffer member alone, in which FIG. 17(a) is a front view of the second buffer member, FIG. 17(b) is a plan side view of FIG. 17(a), FIG. 17(c) is a right side view of FIG. 17(a), FIG. 17(d) is a lower surface view of FIG. 17(a), and FIG. 17(e) is a right side view of FIG. 17(c).

FIG. 18 is a perspective view illustrating a stationary tilt lock gear alone, in which FIG. 18(a) is a perspective view of the stationary tilt lock gear taken from an oblique lower side of an outside in a vehicle width direction, and FIG. 18(b) is a perspective view taken from a lower side lower than that FIG. 18(a).

FIG. 19 is a part view illustrating a stationary tilt lock gear alone, in which FIG. 19(a) is a front view of the stationary tilt lock gear, FIG. 19(b) is a plan side view of FIG. 19(a), and FIG. 19(c) is a lower surface view of FIG. 19(a).

MODE FOR CARRYING OUT THE INVENTION

In the following embodiment, a description will be given of an example in which the present invention is applied to a steering device of a tilt telescopic type, which adjusts both positions of a vertical position and a longitudinal direction of a steering wheel.

Figure 1:
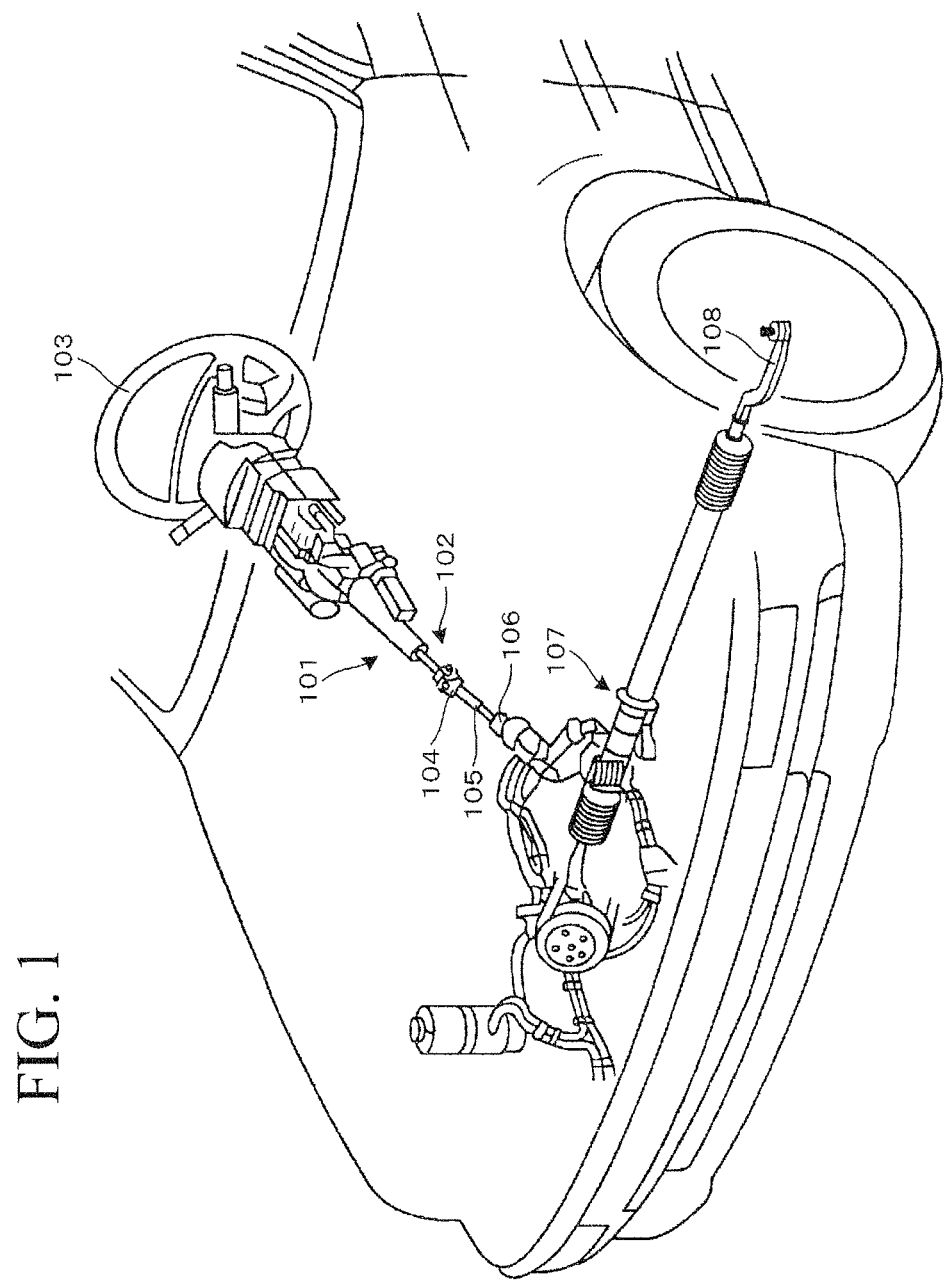
FIG. 1 is an entire perspective view illustrating a state in which a steering device 101 is attached to a vehicle according to the present invention.

FIG. 1 is an entire perspective view illustrating a state in which a steering device 101 is attached to a vehicle according to the present invention. The steering device 101 rotatably pivotally supports a steering shaft 102. A steering wheel 103 is installed to an upper end (vehicle body rear side) of the steering shaft 102, and an intermediate shaft 105 is coupled to a lower end (vehicle body front side) of the steering shaft 102 through a universal joint 104.

A universal joint 106 is coupled to a lower end of the intermediate shaft 105, and a steering gear 107 formed of a rack and pinion mechanism is coupled to the universal joint 106.

When a driver rotationally operates the steering wheel 103, its rotating force is transmitted to the steering gear 107 through the steering shaft 102, the universal joint 104, the intermediate shaft 105, and the universal joint 106. Then, the rotating force is moved to a tie rod 108 through the rack and pinion mechanism, thereby enabling a steering angle of the wheels to change.

Figure 2:
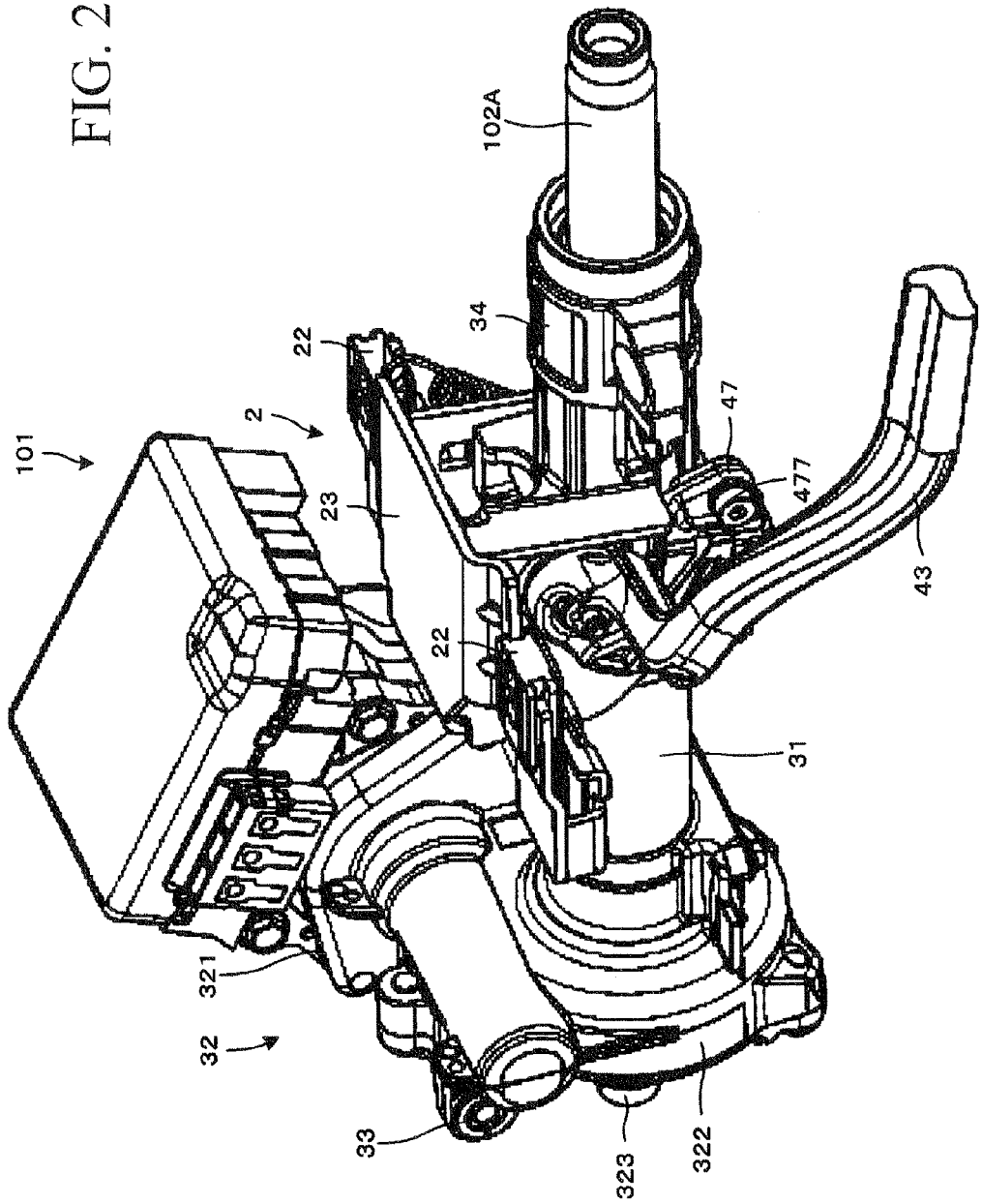
FIG. 2 is a perspective view illustrating a main portion of the steering device 101 viewed from top left of a backward of a vehicle body according to an embodiment of the present invention.
Figure 3:
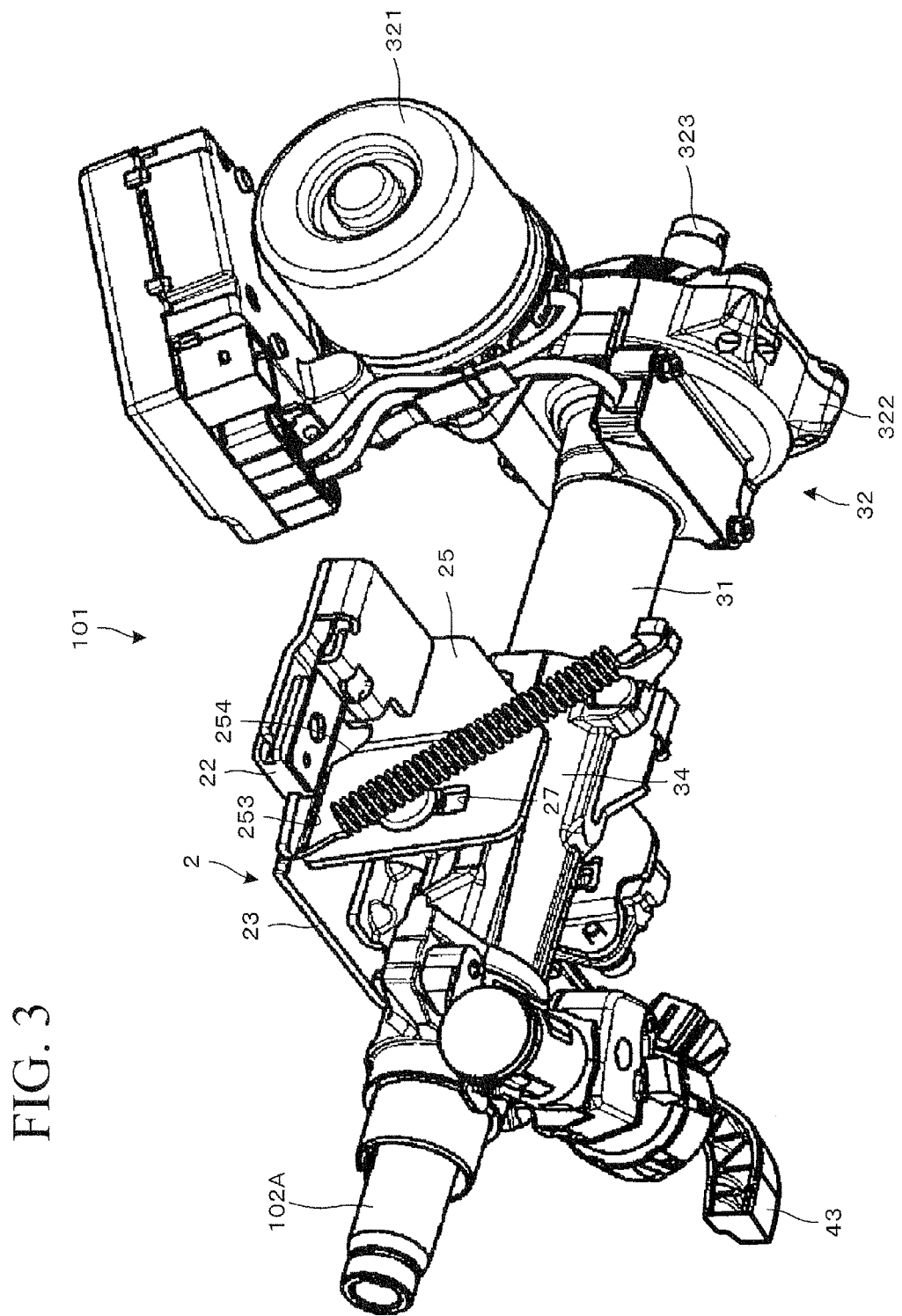
FIG. 3 is a perspective view illustrating a main portion of the steering device 101 viewed from bottom right of the backward of the vehicle body according to the embodiment of the present invention.
Figure 4:
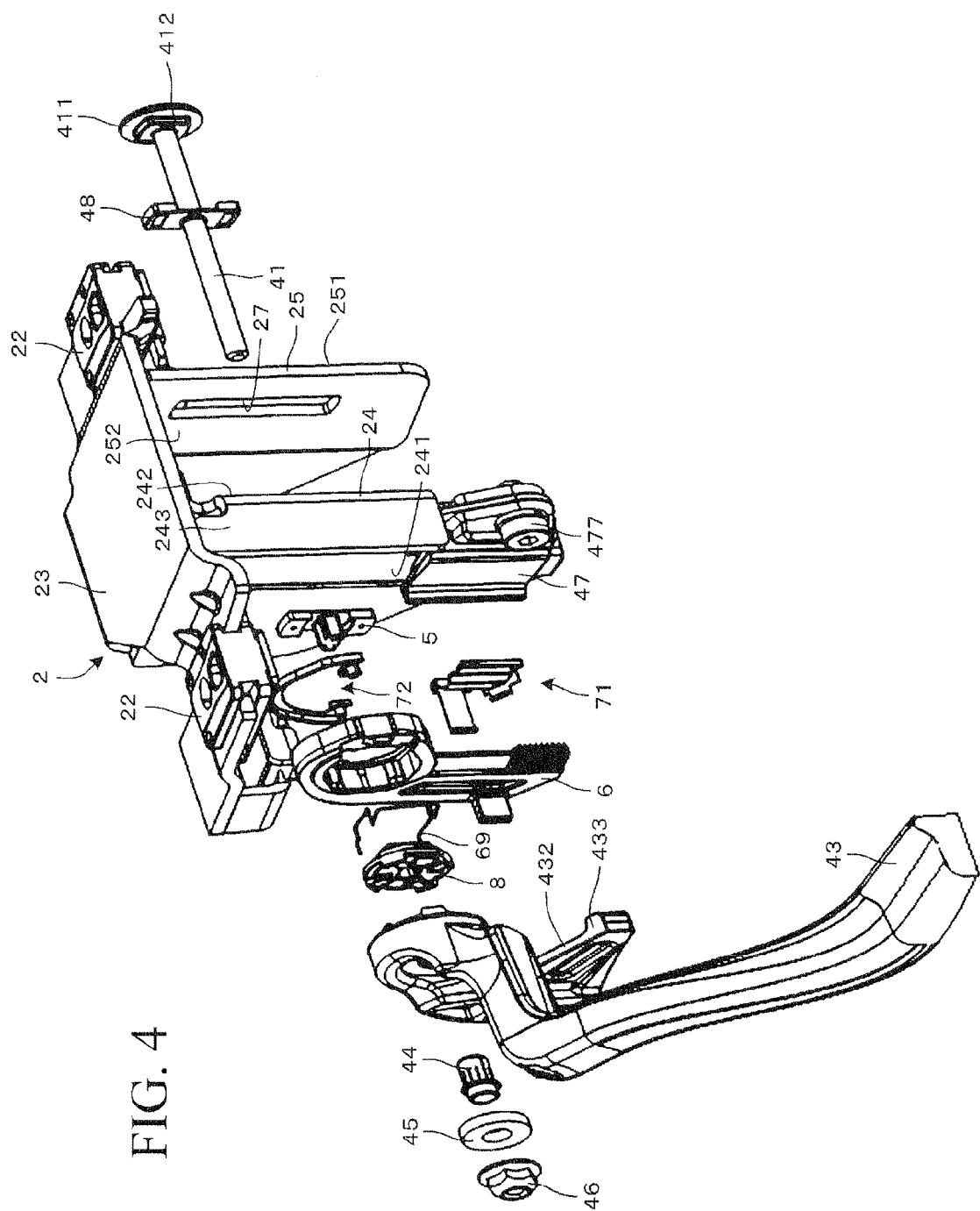
FIG. 4 is an exploded perspective view illustrating a vehicle body attachment bracket periphery viewed from top left of the backward of the vehicle body.
Figure 5:
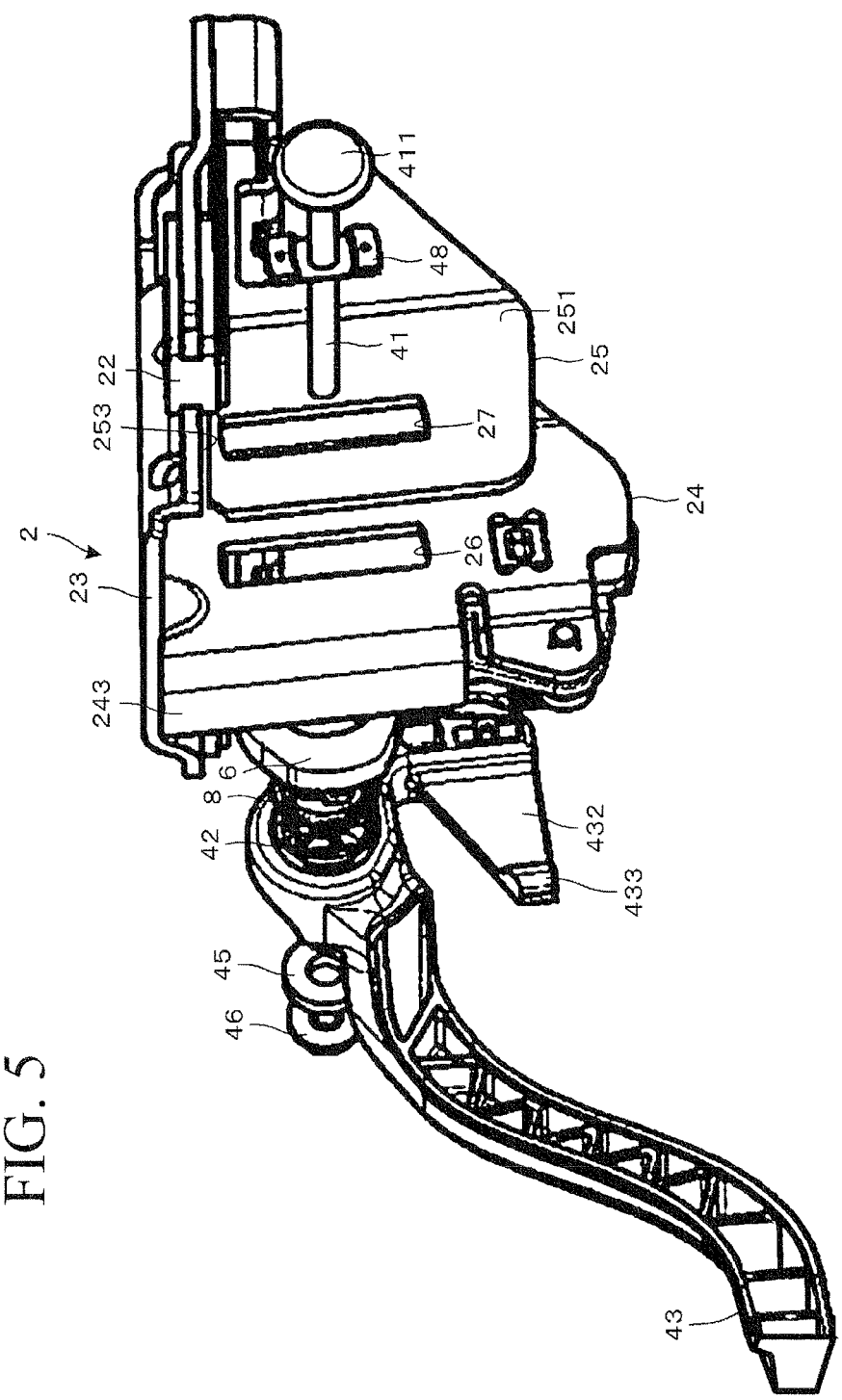
FIG. 5 is an exploded perspective view illustrating the vehicle body attachment bracket periphery viewed from bottom right of the backward of the vehicle body.
Figure 6:
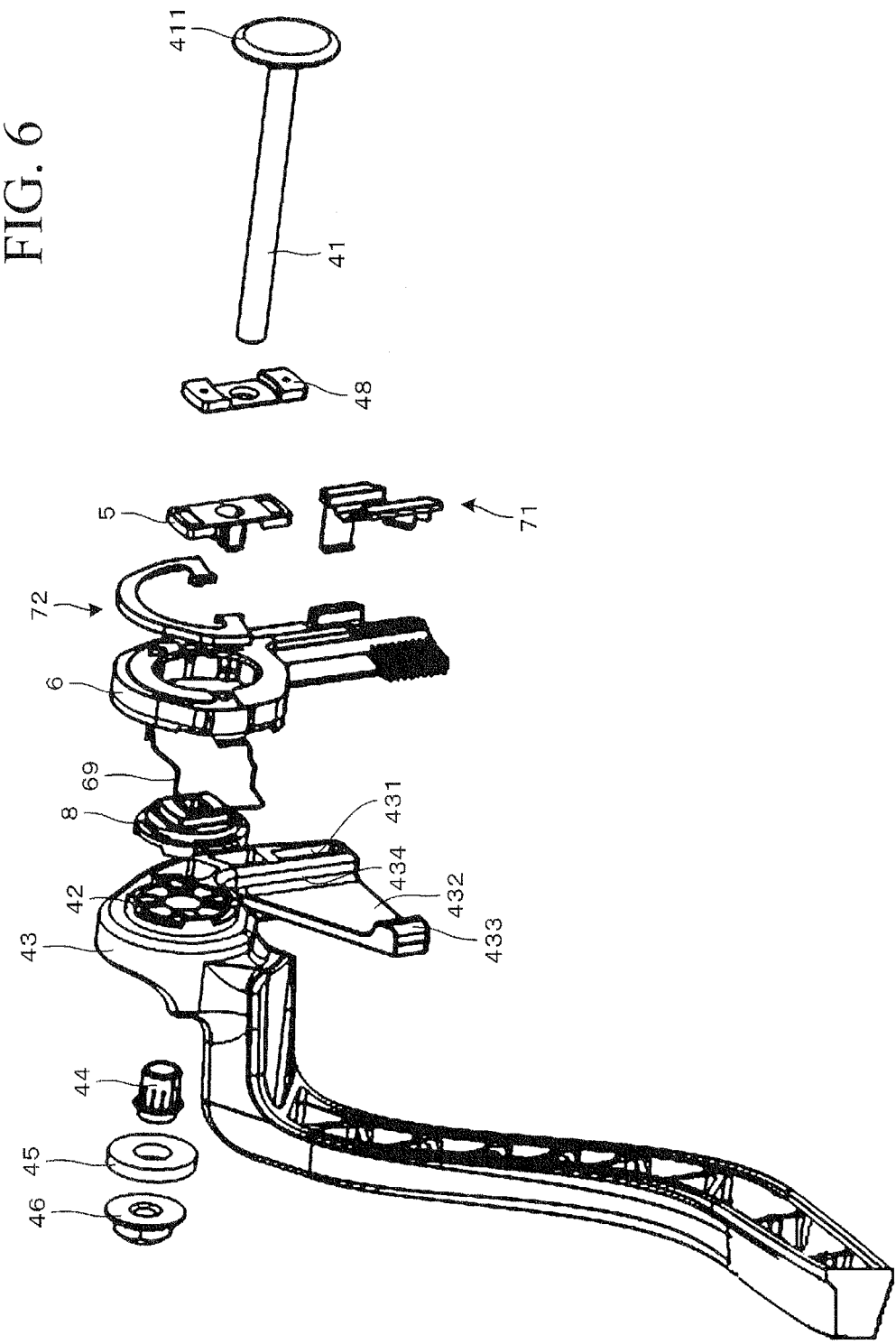
FIG. 6 is an exploded perspective view in which the vehicle body attachment bracket is omitted from FIG. 5.

FIG. 2 is a perspective view illustrating a main portion of the steering device 101 viewed from top left of a backward of a vehicle body according to an embodiment of the present invention. FIG. 3 is a perspective view illustrating a main portion of the steering device 101 viewed from bottom right of the backward of the vehicle body according to the embodiment of the present invention. FIG. 4 is an exploded perspective view illustrating a vehicle body attachment bracket periphery viewed from top left of the backward of the vehicle body. FIG. 5 is an exploded perspective view illustrating the vehicle body attachment bracket periphery viewed from bottom right of the backward of the vehicle body. FIG. 6 is an exploded perspective view in which the vehicle body attachment bracket is omitted from FIG. 5.

As illustrated in FIGS. 2 and 3, the steering device 101 according to the embodiment of the present invention includes a vehicle body attachment bracket 2, an inner column (lower column) 31, a steering assist unit 32 (power assist mechanism), and an outer column (upper column) 34.

The vehicle body rear end of the steering assist unit (power assist mechanism) 32 is fixed to the vehicle body front side (left side of FIG. 2) of the inner column 31 by press fitting. The steering assist unit 32 includes an electric motor 321, a reduction gear box unit 322, and an output shaft 323. In the steering assist unit 32, a bracket 33 formed integrally with the vehicle body front end of the steering assist unit 32 is supported to a vehicle body not shown through a tilt center shaft not shown so as to adjust a tilt position.

An inner peripheral surface of the outer column 34 is fitted onto an outer peripheral surface of the inner column 31 so as to adjust a telescopic position (slidable in parallel to a center axial line of the inner column 31). An upper steering shaft 102A is rotatably pivotally supported by the outer column 34, and the steering wheel 103 (refer to FIG. 1) is fixed to the vehicle body rear side (right side of FIG. 2) of the upper steering shaft 102A. A slit (not shown) that penetrates from an outer peripheral surface to an inner peripheral surface of the outer column 34 is formed in the vehicle body lower side of the outer column 34. The slit is shaped to be opened at the vehicle body front end side of the outer column 34, and closed at the vehicle body rear end.

A lower steering shaft, not shown, is rotatably pivotally supported by the inner column 31, and the lower steering shaft is spline-fitted to the upper steering shaft 102A. Accordingly, the rotation of the upper steering shaft 102A is transmitted to the lower steering shaft regardless of the telescopic position of the outer column 34.

The steering assist unit 32 detects a torque exerted on the lower steering shaft, drives the electric motor 321, and rotates the output shaft 323 by a required steering assist force. The rotation of the output shaft 323 is transmitted to the steering gear 107 through the universal joint 104, the intermediate shaft 105, and the universal joint 106 so that the steering angle of the wheel can be changed while assisting the steering force.

The vehicle body attachment bracket 2 that holds the outer column 34 from both sides thereof in the vehicle width direction is attached to the vehicle body front side (left side of FIG. 2, right side of FIG. 3) of the outer column 34. As illustrated in FIGS. 2 to 5, the vehicle body attachment bracket 2 is made of metal, and includes an upper plate 23 formed substantially horizontally in the vehicle width direction, and a pair of right and left side plates 24 and 25 that extend from the upper plate 23 toward the vehicle body lower side, and hold the outer column 34 from both sides thereof in the vehicle width direction.

Notch grooves (vehicle body rear sides are opened) not shown are formed in both sides of the upper plate 23 in the vehicle width direction, and the upper plate 23 is attached to the vehicle body through two capsules 22 fitted into the notch grooves.

When the driver collision con ides with the steering wheel 103 to exert a large impact force during the secondary collision, the vehicle body attachment bracket 2 is detached from the capsules 22 toward the vehicle body front side. Then, the vehicle body attachment bracket 2 and the outer column 34 are collapse-moved to the vehicle body front side while being guided to the inner column 31, and absorb an impact energy during collision.

A pair of clamp members, not shown, which projects from the outer column 34 toward the outside in the vehicle width direction are integrally formed on the vehicle body front side of the outer column 34. A telescopic adjustment slender groove not shown which longwise extends in the axial direction of the outer column 34 is formed in the clamp member. Also, tilt adjustment slender grooves 26 and 27 are formed in the side plates 24 and 25 of the vehicle body attachment bracket 2, respectively. The tilt adjustment slender grooves 26 and 27 are formed in an arc shape centered on a tilt center axis. An outer surface of the clamp member of the outer column 34 slidably contacts inner surfaces 242 and 252 of the side plates 24 and 25 of the vehicle body attachment bracket 2.

A round bar shaped fastening rod 41 is inserted through the tilt adjustment slender grooves 26 and 27 and the telescopic adjustment slender groove from right sides of FIGS. 4 and 6. A tilt stopper 48 is fitted onto the fastening rod 41, and a left end of the fastening rod 41 is allowed to pass through the right tilt adjustment slender groove 27, the right telescopic adjustment slender groove, the left telescopic adjustment slender groove, and the left tilt adjustment slender groove 26. A tilt stopper 5, a movable tilt lock gear 6, a wire spring (spring) 69, a stationary cam 8, a movable cam 42, an operating lever 43, a collar 44, and a thrust bearing 45 are fitted onto the left end side of the fastening rod 41 in the order from right. Then, a nut 46 is fastened to a left end of the fastening rod 41 for fixation.

The stationary cam 8 and the movable cam 42 are each made of a sintered material, and subjected to a heat treatment for providing high hardness, and therefore provide durability for withstanding a large clamp force. A rectangular locking unit 412 is formed on a disc-shaped head 411 at a right end of the fastening rod 41. The rectangular locking unit 412 is fitted to the right tilt adjustment slender groove 27, and the fastening rod 41 is locked with respect to the side plate 24. The right tilt stopper 48 is made of a synthetic resin, has a substantially rectangular configuration longitudinal in the tilt direction, and is formed with a width across flat having substantially the same dimension as the groove width of the tilt adjustment slender groove 27. Accordingly, the right tilt stopper 48 is fitted into the tilt adjustment slender groove 27, smoothly slides in a tilt adjustment direction when adjusting the tilt position of the outer column 34, and abuts against an end of the tilt adjustment slender groove 27 at the tilt adjustment end for reduction of the impact. The movable cam 42 is fitted into the operating lever 43, and rotates integrally with the operating lever 43. The operating lever 43 is made of a synthetic resin such as polyacetal (POM) which is excellent in a mechanical property and small in abrasion or friction coefficient.

As illustrated in FIGS. 4 and 5, a rib 243 that is bent from the side plate 24 toward the outside in the vehicle width direction at a right angle is formed at the vehicle body rear end of the left side plate 24. The rib 243 is formed along the tilt adjustment slender groove 26 in the vicinity of the tilt adjustment slender groove 26. Also, an upper end of the vehicle body of the rib 243 is fixed to the upper plate 23 of the vehicle body attachment bracket 2 by welding.

A lower end of the vehicle body of the rib 243 extends up to an upper end of a stationary tilt lock gear 47 that will be described later, but may extend down to a lower end of the stationary tilt lock gear 47. Accordingly, the rib 243 provides the large rigidity of the side plates 24 and 25 in the vicinity of the tilt adjustment slender groove 26, and when the operating lever 43 is rotationally operated in order that the outer column 34 is clamped to the vehicle body attachment bracket 2, the elastic deformation of the side plate 24 is suppressed.

Also, as illustrated in FIGS. 3 and 5, the vehicle body upper end of the right side plate 25 has a vehicle front side fixed to the upper plate 23 of the vehicle body attachment bracket 2 by welding. Also, a gap 253 is formed between a vehicle rear side of the vehicle body upper end of the right side plate 25 and the upper plate 23 of the vehicle body attachment bracket 2. Accordingly, the gap 253 provides the small rigidity of the side plate 25 in the vicinity of the tilt adjustment slender groove 27, and the elastic deformation of the side plate 25 is facilitated when the operating lever 43 is rotationally operated in order that the outer column 34 is clamped to the vehicle body attachment bracket 2.

Figure 8:
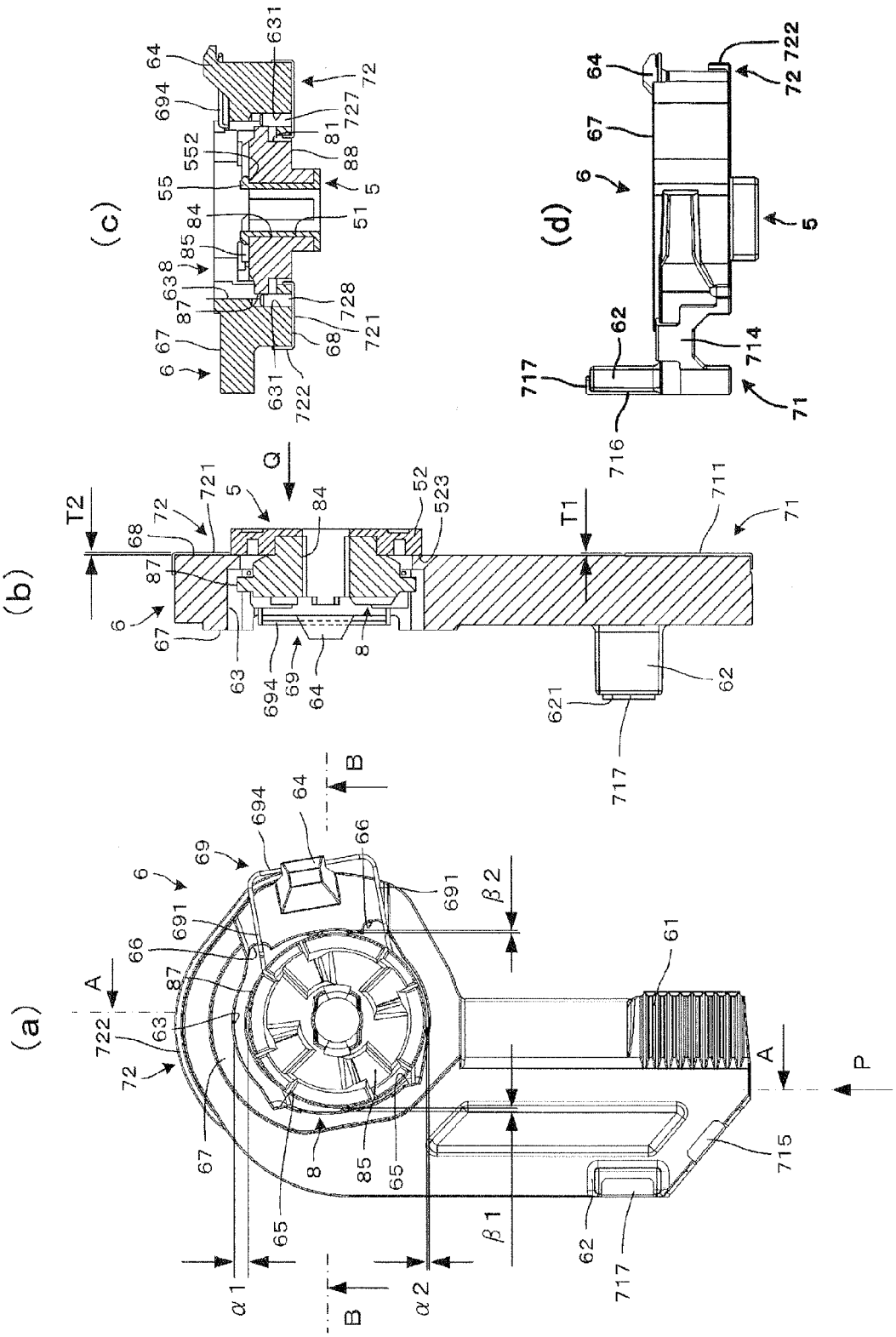
FIG. 8 illustrates a state in which the movable tilt lock gear, the stationary cam, and the wire spring are assembled integrally by the tilt stopper, in which FIG. 8(*a*) is a front view thereof, FIG. 8(*b*) is a cross-sectional view taken along a line A-A of FIG. 8(*a*), FIG. 8(*c*) is a cross-sectional view taken along a line B-B of FIG. 8(*a*), and FIG. 8(*d*) is a view taken in the direction of an arrow P in FIG. 8(*a*).
Figure 9:
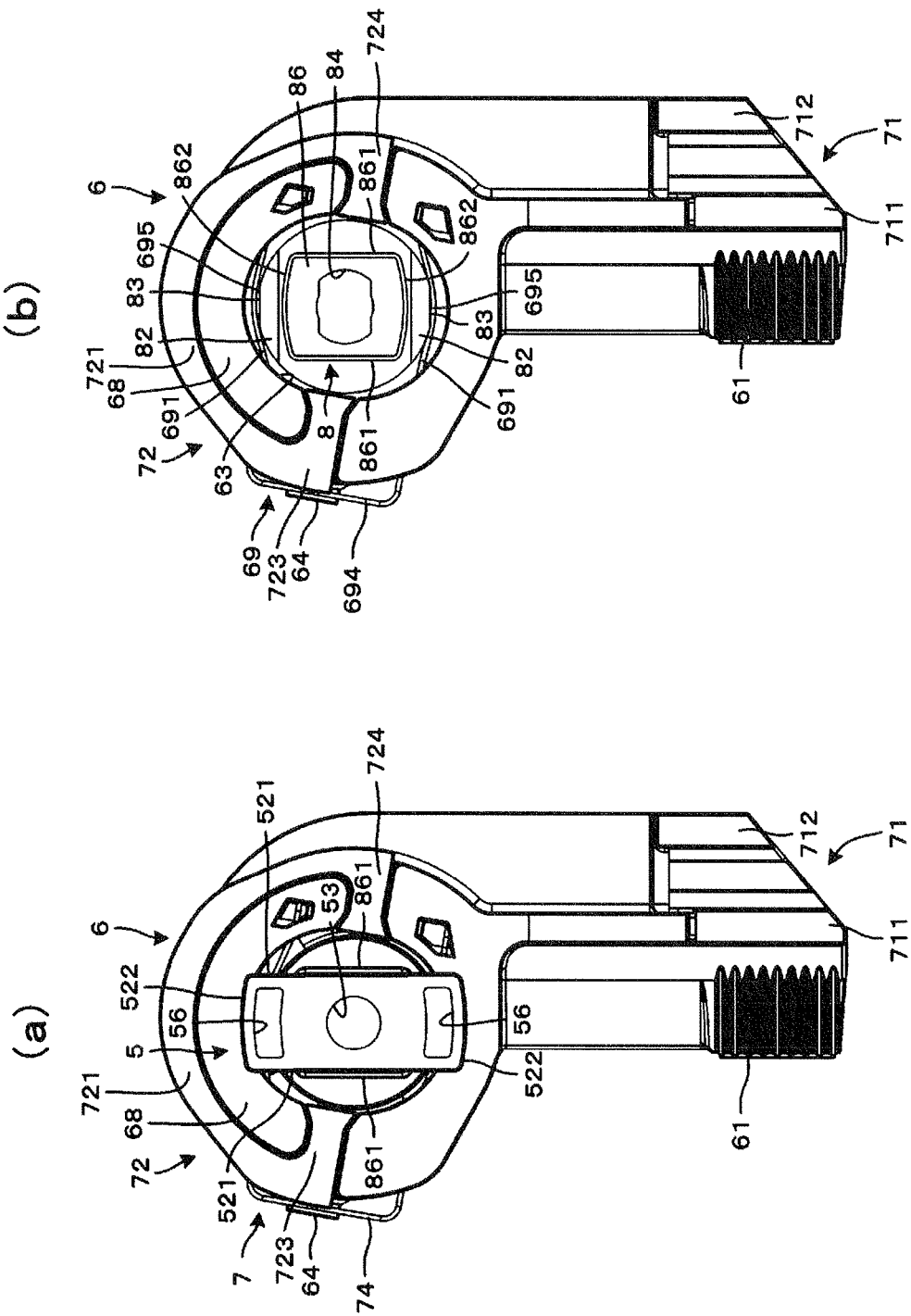
FIG. 9(*a*) is a view taken in the direction of an arrow Q in FIG. 8(*b*), and FIG. 9(*b*) is a front view illustrating a state in which the tilt stopper is removed from FIG. 9(*a*).

Because four parts of the tilt stopper 5, the movable tilt lock gear 6, the wire spring (spring) 69, and the stationary cam 8 are assembled integrally so as to be dealt with as one part, the assembling efficiency is improved. That is, FIG. 7 illustrates a state in which the movable tilt lock gear 6, the stationary cam 8, and the wire spring 69 are assembled integrally by the tilt stopper 5, in which FIG. 7(a) is a perspective view taken from an inclined cam surface side of the stationary cam 8, and FIG. 7(b) is a perspective view taken from a rear side of FIG. 7(a). FIG. 8 illustrates a state in which the movable tilt lock gear 6, the stationary cam 8, and the wire spring 69 are assembled integrally by the tilt stopper 5, in which FIG. 8(a) is a front view thereof, FIG. 8(b) is a cross-sectional view taken along a line A-A of FIG. 8(a), FIG. 8(c) is a cross-sectional view taken along a line B-B of FIG. 8(a), and FIG. 8(d) is a view taken in the direction of an arrow P in FIG. 8(a). FIG. 9(a) is a view taken in the direction of an arrow Q in FIG. 8(b), and FIG. 9(b) is a front view illustrating a state in which the tilt stopper is removed from FIG. 9(a).

Figure 10:
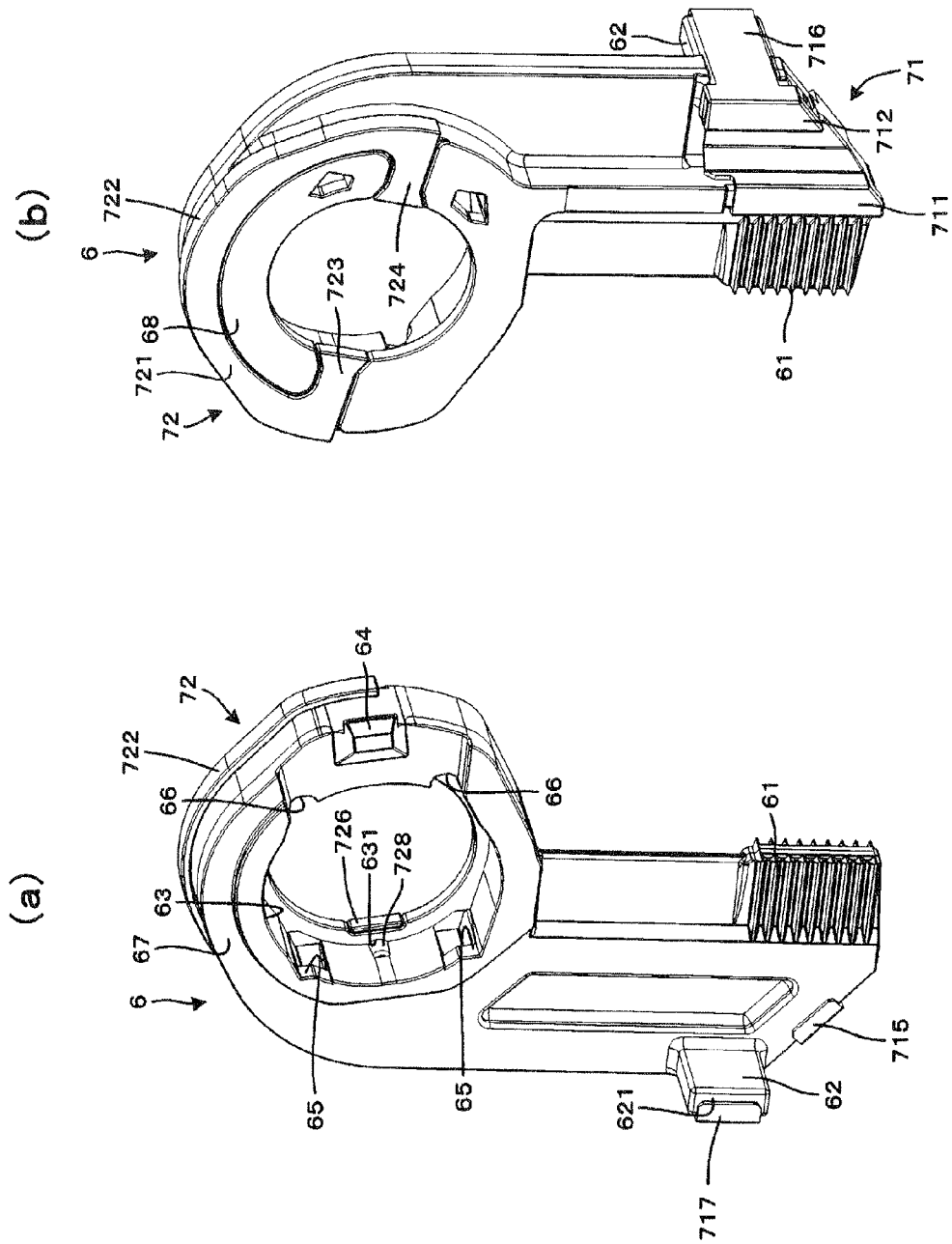
FIG. 10(*a*) is a perspective view illustrating a state in which the stationary cam, the wire spring, and the tilt stopper are removed from FIG. 7(*a*), and FIG. 10(*b*) is a perspective view illustrating a state in which the stationary cam, the wire spring, and the tilt stopper are removed from FIG. 7(*b*).
Figure 11:
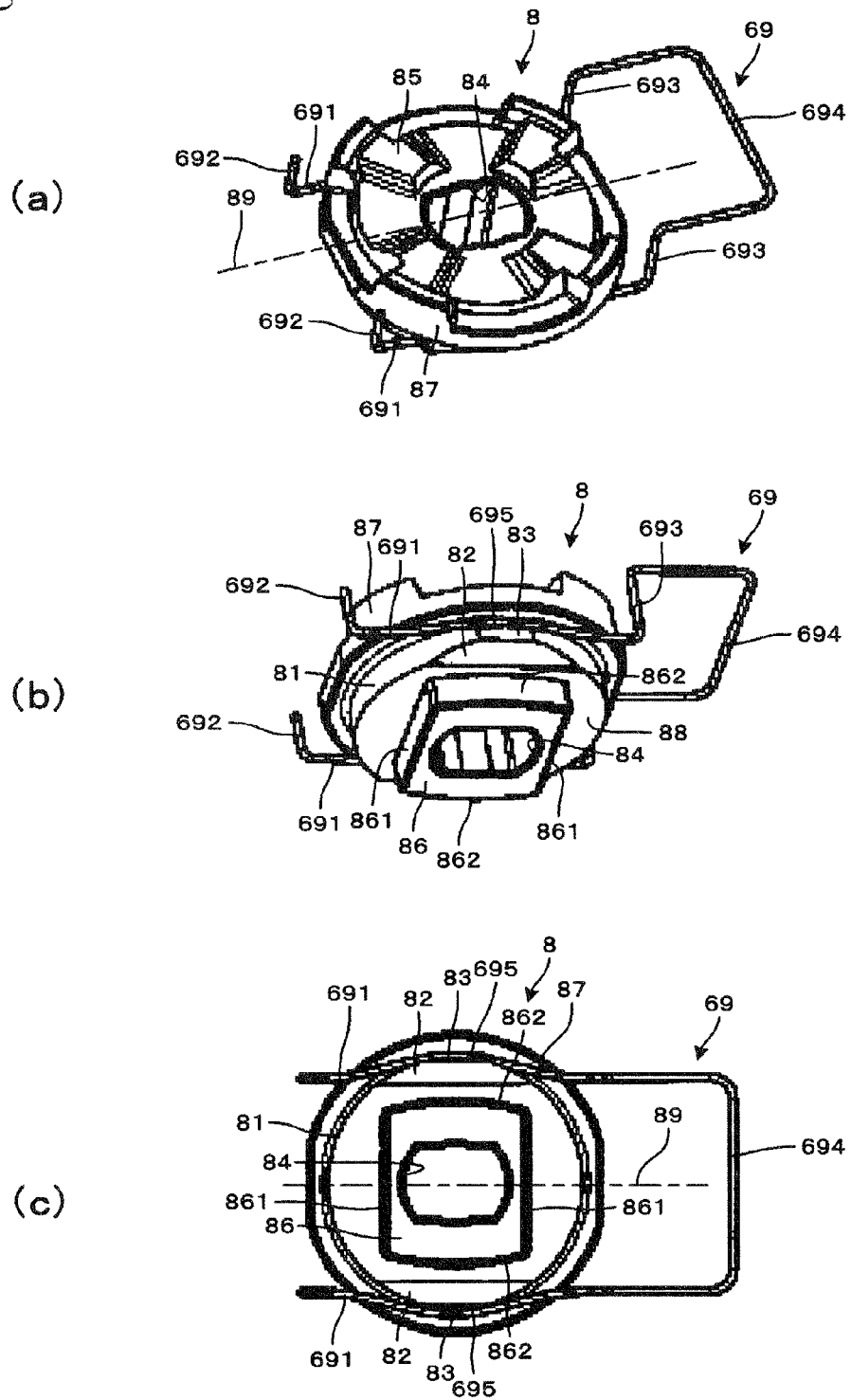
FIG. 11 illustrates an engagement state of the stationary cam and the wire spring, in which FIG. 11(*a*) is a perspective view taken from the inclined cam surface side of the stationary cam, FIG. 11(*b*) is a perspective view taken from a locking unit side of the stationary cam, and FIG. 11(*c*) is a front view taken from the locking unit side of the stationary cam.

FIG. 10(a) is a perspective view illustrating a state in which the stationary cam 8, the wire spring 69, and the tilt stopper 5 are removed from FIG. 7(a), and FIG. 10(b) is a perspective view illustrating a state in which the stationary cam 8, the wire spring 69, and the tilt stopper 5 are removed from FIG. 7(b). FIG. 11 illustrates an engagement state of the stationary cam 8 and the wire spring 69, in which FIG. 11(a) is a perspective view taken from the inclined cam surface side of the stationary cam 8, FIG. 11(b) is a perspective view taken from a locking unit side of the stationary cam 8, and FIG. 11(c) is a front view taken from the locking unit side of the stationary cam 8.

The movable tilt lock gear 6 is made of metal, and formed to be slender in the vertical direction of the vehicle body, and gears 61 are formed on the vehicle body lower side of the movable tilt lock gear 6 on both sides in the vehicle width direction. The gears 61 are longitudinal in the lateral direction of FIG. 8(a) and tapered, and a plurality of the gears 61 is formed in the vertical direction of the vehicle body. Also, as illustrated in FIGS. 2 and 4, the stationary tilt lock gear 47 is fixed onto an outer surface 241 of the left side plate 24 with a bolt 477. The stationary tilt lock gear 47 is bent in a U-shape so that the vehicle body front side is opened, and a plurality of gears (refer to FIG. 19(b)) 471 is formed in the vertical direction of the vehicle body on both inner sides thereof in the vehicle width direction.

A projection 62 is formed on an outer surface of the movable tilt lock gear 6 in the vehicle width direction, and the projection 62 is engaged with a recess 431 (refer to FIG. 6) formed in the operating lever 43. Accordingly, the movable tilt lock gear 6 rotates in synchronism with the rotating operation of the operating lever 43. When the operating lever 43 is rotated counterclockwise in order to clamp the outer column 34 to the vehicle body attachment bracket 2, the movable tilt lock gear 6 is also rotated counterclockwise, and the gear 61 of the movable tilt lock gear 6 is engaged with the gears 471 of the stationary tilt lock gear 47 to provide a high retention force in the tilt direction.

When the operating lever 43 is rotated clockwise in order to unclamp the outer column 34 from the vehicle body attachment bracket 2, the movable tilt lock gear 6 also rotates clockwise, and the gear 61 of the movable tilt lock gear 6 is withdrawn from the gears 471 of the stationary tilt lock gear 47.

A through hole 63 that is parallel to the axial core of the fastening rod 41 is formed on the vehicle body upper side of the movable tilt lock gear 6, and the cylindrical stationary cam 8 is fitted into the through hole 63. The inner diameter of the through hole 63 is larger in the vertical direction of the vehicle body (vertical direction of FIG. 8(a)), and smaller in the longitudinal direction of the vehicle body (lateral direction of FIG. 8(a)). As a result, in gaps between a large-diameter outer peripheral surface (outer peripheral surface of an inclined cam surface 85 side of the stationary cam 8) 87 of the stationary cam 8 and the through hole 63 have a relationship of $\alpha 1+\alpha 2 > \beta 1+\beta 2$ in which gaps $\alpha 1$ and $\alpha 2$ in the vertical direction of the vehicle body are larger than gaps $\beta 1$ and $\beta 2$ in the longitudinal direction of the vehicle body. The movable tilt lock gear 6 is movable with respect to the stationary cam 8 by this gap.

Before the stationary cam 8 is fitted into the movable tilt lock gear 6, the wire spring 69 is assembled with the movable tilt lock gear 6. As illustrated in FIG. 11, the wire spring 69 is formed by bending one wire, and includes a pair of linear arm parts 691, 691 parallel to each other, bent parts 692 and 693 formed at both ends of the respective arm parts 691, 691, and a U-shaped connecting part 694 connecting one bent parts 693, 693.

As illustrated in FIGS. 7 and 8, the arm parts 691, 691 and the bent parts 692, 693 of the wire spring 69 are inserted into the through hole 63 of the movable tilt lock gear 6, and the connecting part 694 is hooked on an engagement projection 64 of the movable tilt lock gear 6. The engagement projection 64 is formed on an end surface 67 of the movable cam 42 side of the movable tilt lock gear 6. Then, one bent parts 692, 692 are engaged with engagement recesses 65, 65 formed in the through hole 63, and the other bent parts 693, 693 are engaged with engagement recess parts 66, 66. As a result, the wire spring 69 is attached to the movable tilt lock gear 6 so as to prevent the movement within a plane parallel to a paper plane of FIG. 8(a), and the movement in a direction orthogonal to the paper plane of FIG. 8(a).

Subsequently, the stationary cam 8 is fitted into the through hole 63 of the movable tilt lock gear 6. Then, the arm parts 691, 691 of the wire spring 69 are elastically deformed with the bent parts 692 and 692 as fulcrums, and a cylindrical small-diameter outer peripheral surface (outer peripheral surface on the locking unit 86 side of the stationary cam 8) 81 of the stationary cam 8 is held between the arm parts 691, 691. An inclined surface 82 (refer to FIG. 11(b)) is formed on an outer peripheral surface 81 of the stationary cam 8. The inclined surfaces 82 are formed at two places of the outer peripheral surface 81 opposed at 180 degrees, and when the stationary cam 8 is fitted into the through hole 63, the outer peripheral surface 81 of the stationary cam 8 is smoothly guided between the arm parts 691 and 691.

Also, a plane 83 (refer to FIG. 11(b)) is formed on the outer peripheral surface 81 of the stationary cam 8. The plane 83 formed at two places opposed by 180 degrees on the outer peripheral surface 81, and when the stationary cam 8 is fitted into the through hole 63, the phase of the stationary cam 8 is easily adjustable with respect to the movable tilt lock gear 6. Also, the respective intermediate positions of the arm parts 691, 691 in the longitudinal direction are formed with arc parts 695, 695. The radius of curvature of the arc parts 695, 695 is identical with the radius of curvature of the outer peripheral surface 81 of the stationary cam 8. Accordingly, the center of the through hole 63 of the movable tilt lock gear 6 is held in the center of the stationary cam 8 by an urging force of the arm parts 691, 691.

As illustrated in FIG. 11(a), the inclined cam surface 85 that is engaged with an inclined cam surface of the movable cam 42 is formed on one end surface of the stationary cam 8 (an end surface facing the movable cam 42 when the stationary cam 8 is assembled with the fastening rod 41). Also, as illustrated in FIGS. 11(b) and 11(c), a locking unit 86 is formed on the other end surface of the stationary cam 8 (an end surface facing the side plate 24 of the vehicle body attachment bracket 2 when the stationary cam 8 is assembled with the fastening rod 41).

Planes 861 and 861 each having a width across flat slightly narrower than the groove width of the tilt adjustment slender grooves 26 and 27 are on the locking unit 86. Accordingly, the planes 861 and 861 are fitted into the tilt adjustment slender groove 26, and the stationary cam 8 is locked with respect to the side plates 24 and 25. Also, the planes 861 and 861 are guided in the tilt adjustment slender groove 26 so as to be slidable in the tilt adjustment direction. Also, arc surfaces 862, 862 are formed on the end surface of the locking unit 86 in the tilt adjustment direction (vertical direction in FIG. 11(c)).

As illustrated in FIGS. 11(a) and 11(c), because the stationary cam 8 is symmetrical with respect to a line 89 that passes through the center of the stationary cam 8 as an axis of symmetry, assembling is enabled even if the phase is replaced by 180 degrees. Although not shown, the movable cam 42 is also symmetric with respect to a line that passes through the center of the movable cam 42 as the axis of symmetry, and the assembling is enabled even if the phase is replaced by 180 degrees.

Subsequently, as illustrated in FIG. 8(b), the tilt stopper 5 is inserted into a through hole 84 formed in the axial core of the stationary cam 8, and four parts of the tilt stopper 5, the movable tilt lock gear 6, the wire spring 69, and the stationary cam 8 are assembled integrally. FIG. 12 is a perspective view illustrating a tilt stopper alone, in which FIG. 12(a) is a perspective view of the tilt stopper taken from an engagement projection side, and FIG. 12(b) is a perspective view of the tilt stopper taken from a flange side. FIG. 13 is a part view illustrating the tilt stopper alone, in which FIG. 13(a) is a front view of the tilt stopper, FIG. 13(b) is a left side view of FIG. 13(a), FIG. 13(c) is a right side view of FIG. 13(a), and FIG. 13(d) is a plan view of FIG. 13(a).

As illustrated in FIGS. 12 and 13, the tilt stopper 5 is made of a synthetic resin, and includes a cylindrical part 51 shaped in a hollow cylinder, and a flange part 52 shaped in a rectangular thin plate integrated with one end (left end of FIG. 13(a)) of the cylindrical part 51. A through hole 53 into which the fastening rod 41 is inserted is formed in the cylindrical part 51 and the flange part 52, and slits 54, 54 are formed to extend from the outer peripheral surface of the cylindrical part 51 to the through hole 53.

Engagement projections 55, 55 that project from the outer peripheral surface of the cylindrical part 51 toward the outside in the radial direction are formed on the other end (right end of FIG. 13(a) of the cylindrical part 51. Inclined surfaces 551, 551 are formed on the respective engagement projections 55, 55 on the other end side of the cylindrical part 51. Engagement surfaces 552, 552 orthogonal to the axial core of the cylindrical part 51 are formed on one end side of the cylindrical part 51. The inclined surfaces 551, 551 are inclined closer to the axial core of the cylindrical part 51 toward the other end side of the cylindrical part 51.

Planes 521, 521 each projecting outward from the outer peripheral surface of the cylindrical part 51, and having a width across flat slightly narrower than the groove width of the tilt adjustment slender grooves 26 and 27 are formed on the flange part 52. Accordingly, the planes 521, 521 of the flange part 52 are f fitted into the tilt adjustment slender grooves 26 and 27 so as to be slidable in the tilt adjustment direction. The width across flat of the planes 521, 521 of the flange part 52 is slightly narrower than the width across flat of the planes 861 and 861 of the stationary cam 8 (refer to FIG. 9 (a)).

Also, arc surfaces 522, 522 are formed on an end surface of the flange part 52 in the tilt adjustment direction (vertical direction of FIGS. 13(b) and 13(c)). The arc surfaces 522, 522 are abutted against the end of the tilt adjustment slender grooves 26 and 27 at the tilt adjustment end to reduce the impact sound. Further, arc grooves (space parts) 56, 56 are formed on the left end surface 524 of the flange part 52 (left end of FIG. 13(a)) at the end of the flange part 52 in the tilt adjustment direction, so that the arc surfaces 522, 522 are easily elastically deformed. Accordingly, when the arc surfaces 522, 522 are abutted against the end of the tilt adjustment slender grooves 26 and 27 at the tilt adjustment end, the arc surfaces 522, 522 are elastically deformed so that the impact of the tilt adjustment end can be reduced.

Also, arc recess surfaces 57, 57 are formed in the right end surface (right end of FIG. 13(a)) 523 of the flange part 52. The radius of curvature of the arc recess surfaces 57, 57 is slightly larger than the radius of curvature of the arc surfaces 862, 862 of the above-mentioned stationary cam 8. Because the tilt stopper 5 is symmetrical with respect to a line (refer to FIGS. 13(b) and 13(c)) 58 that passes through the center of the tilt stopper 5 as an axis of symmetry, assembling is enabled even if the phase is replaced by 180 degrees.

As illustrated in FIGS. 8(b) and 8(c), the cylindrical part 51 of the tilt stopper 5 is inserted into a through hole 84 formed in the axial core of the stationary cam 8. Then, because the inclined surfaces 551 of the engagement projections 55 of the tilt stopper 5 are abutted against the through hole 84 to reduce the diameter of the cylindrical part 51, the cylindrical part 51 can be smoothly inserted into the through hole 84.

When the cylindrical part 51 of the tilt stopper 5 has been inserted into the through hole 84, the cylindrical part 51 is enlarged in diameter, the engagement surfaces 552 of the engagement projections 55 are engaged with the end surface of the inclined cam surface 85 side of the stationary cam 8. Also, the arc recess surfaces 57, 57 of the tilt stopper 5 are fitted onto the arc surfaces 862, 862 of the stationary cam 8. Further, a right end surface 523 (refer to FIG. 8(b)) of the flange part 52 of the tilt stopper 5 is abutted against an end surface (side plate 24 side) 68 of the movable tilt lock gear 6.

Accordingly, upon completion of the assembling, the movable tilt lock gear 6, the wire spring 69, and the stationary cam 8 are integrated together by the tilt stopper 5 to enable those four parts to be prevented from being dispersed during transportation. As a result, the assembling time can be reduced. Also, because those four parts are not displaced in the axial direction, the axial positions of the wire spring 69 and the stationary cam 8 can be held at a fixed position. As a result, the center of the through hole 63 of the movable tilt lock gear 6 can be stably held to the center of the stationary cam 8 by an elastic force of the wire spring 69. Also, because the tilt stopper 5 and the stationary cam 8 are configured by separate parts, it is easy to provide both characteristics of the durability and the impact reduction capability.

An assembly configured by the four parts consisting of the tilt stopper 5, the movable tilt lock gear 6, the wire spring 69, and the stationary cam 8 which have been assembled as described above is held by a hand, and the planes 861 and 861 of the locking unit 86 of the stationary cam 8 are fitted into the tilt adjustment slender groove 26 of the side plate 24 of the vehicle body attachment bracket 2.

Then, the fastening rod 41 shaped in a round bar onto which the tilt stopper 48 is fitted is allowed to pass through the tilt adjustment slender groove 27, the right telescopic adjustment slender groove, the left telescopic adjustment slender groove, and the tilt adjustment slender groove 26. Then, the left end of the fastening rod 41 is inserted into the through hole 53 of the tilt stopper 5 of the assembly configured by the four parts. Thereafter, the movable cam 42, the operating lever 43, the collar 44, and the thrust bearing 45 are fitted onto the left end of the fastening rod 41, and the nut 46 is fastened to the left end of the fastening rod 41 for fixation, thereby completing the assembling of the tilt clamp mechanism. When the fastening rod 41 is allowed to penetrate through the tilt stopper 5, the engagement of the engagement projections 55, 55 can be more ensured.

In order to clamp the outer column 34 to the vehicle body attachment bracket 2, the operating lever 43 is rotationally operated counterclockwise. Then, the stationary cam 8 does not rotate because the planes 861 and 861 of the locking unit 86 of the stationary cam 8 are fitted into the tilt adjustment slender groove 26 to regulate the rotation, and the thread of the inclined cam surface 85 of the stationary cam 8 runs on the thread of the inclined cam surface of the movable cam 42. For that reason, the end surface (refer to FIGS. 8(c) and 11(b)) 88 on the locking unit 86 side of the stationary cam 8 pushes the outer surface 241 of the left side plate 24 inwardly. As described above, because the left side plate 24 is formed with a large rigidity in the vicinity of the tilt adjustment slender groove 26 by the gap 243, the elastic deformation is suppressed.

When the thread of the inclined cam surface 85 of the stationary cam 8 runs on the thread of the inclined cam surface of the movable cam 42, the fastening rod 41 is pulled toward the left side of FIG. 4, and the disc-shaped head 411 pushes an outer surface 251 of the right side plate 25 inwardly. As described above, because the right side plate 25 is formed with a small rigidity in the vicinity of the tilt adjustment slender groove 27 by the gap 253, the right side plate 25 is largely elastically deformed inwardly, and the inner surface 252 of the right side plate 25 strongly presses the outer surface of the right clamp member of the outer column 34. As a result, the outer surfaces of the right and left clamp members of the outer column 34 are strongly held between the inner surface 242 of the left side plate 24 and the inner surface 252 of the right side plate 25.

In this way, the right and left clamp members of the outer column 34 can be fastened to the vehicle body attachment bracket 2 at a given tilt adjustment position with a large retention force for tilt clamping. The tilt clamp mechanism according to the present invention fastens the side plates 24 and 25 directly through no elastic member, and therefore the rigidity can be increased during the tilt clamping. Also, the clamp members are elastically deformed inwardly in a direction where the inner surfaces of the clamp members approach each other, and the width of the slit of the outer column 34 is narrowed. Accordingly, the inner peripheral surface of the outer column 34 is reduced in diameter, and the outer peripheral surface of the inner column 31 is fastened for clamping (telescopic clamp).

Figure 14:
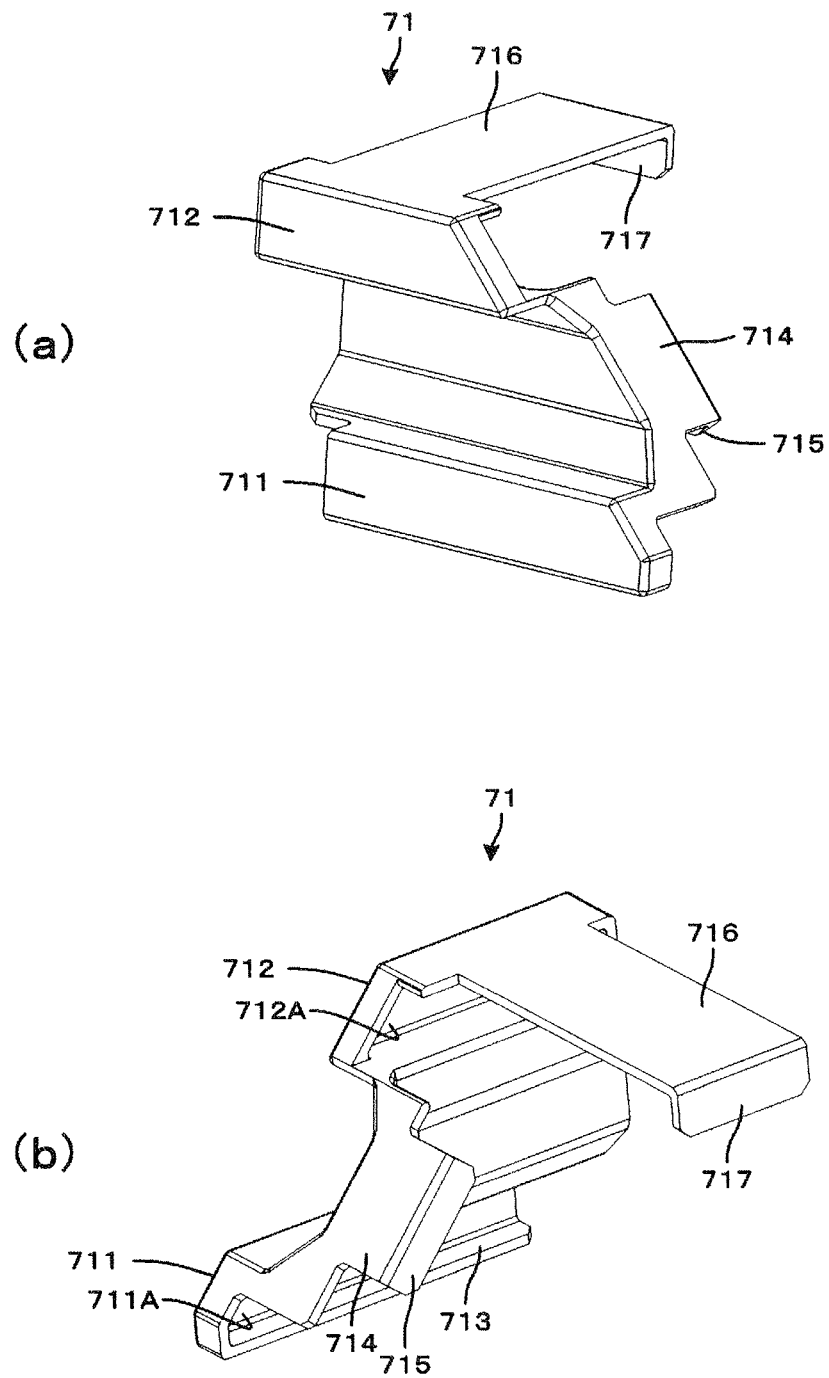
Figure 15:
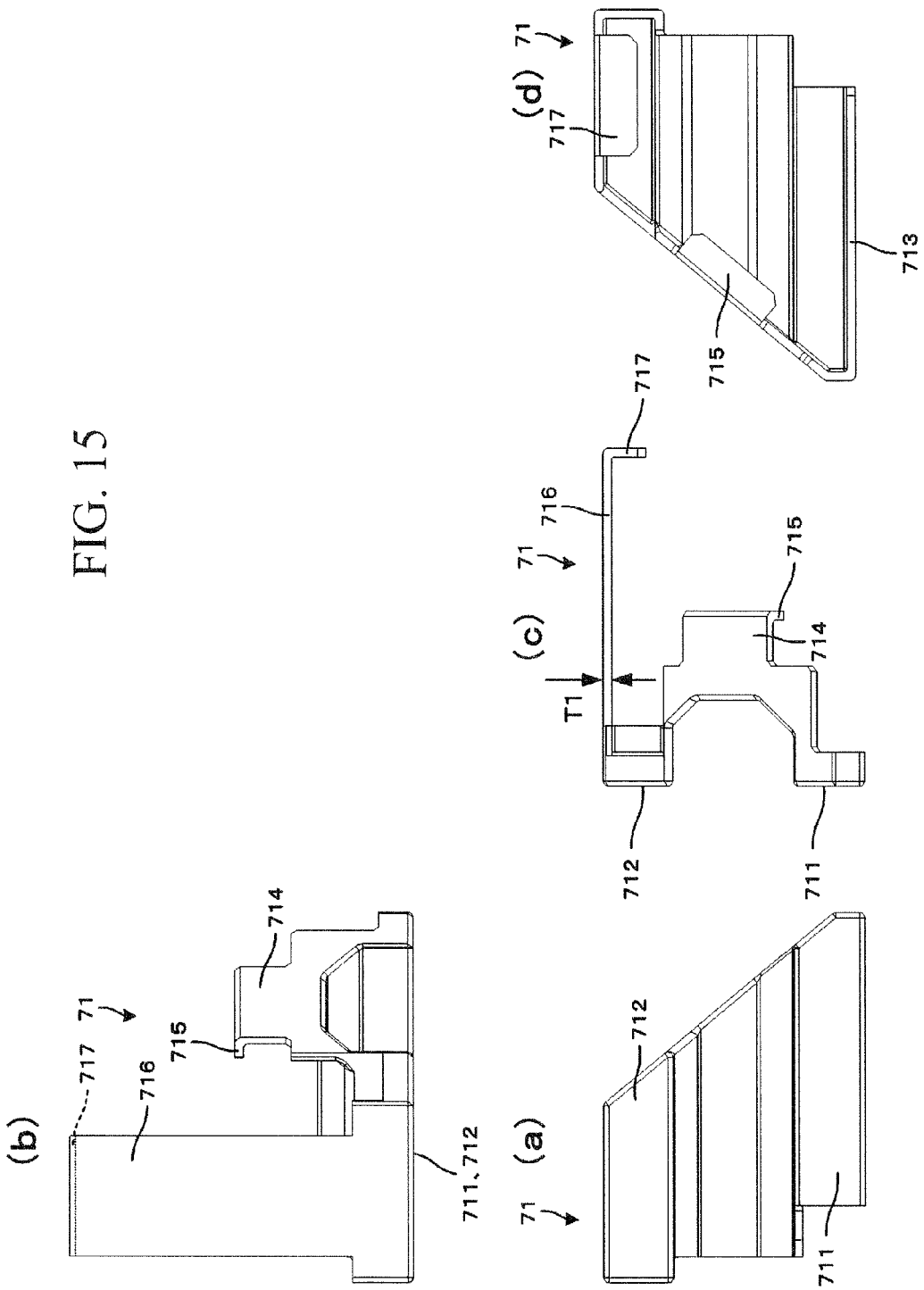

As illustrated in FIGS. 14 to 17, a first buffer member and a second buffer member are attached to the movable tilt lock gear 6 so that a sliding sound and an impact sound between the movable tilt lock gear 6 and the outer surface 241 of the side plate 24 of the vehicle body attachment bracket 2 are reduced. That is, FIG. 14 is a perspective view illustrating the first buffer member 71 alone, in which FIG. 14(a) is a perspective view of the first buffer member 71 taken from a slide surface side, and FIG. 14(b) is a perspective view of the first buffer member 71 taken from a rear surface of the slide surface. FIG. 15 is a part view illustrating the first buffer member 71 alone, in which FIG. 15(a) is a front view of the first buffer member 71, FIG. 15(b) is a left side view of FIG. 15(a), FIG. 15(c) is a right side view of FIG. 15(a), and FIG. 15(d) is a right side view of FIG. 15(c).

Figure 17:
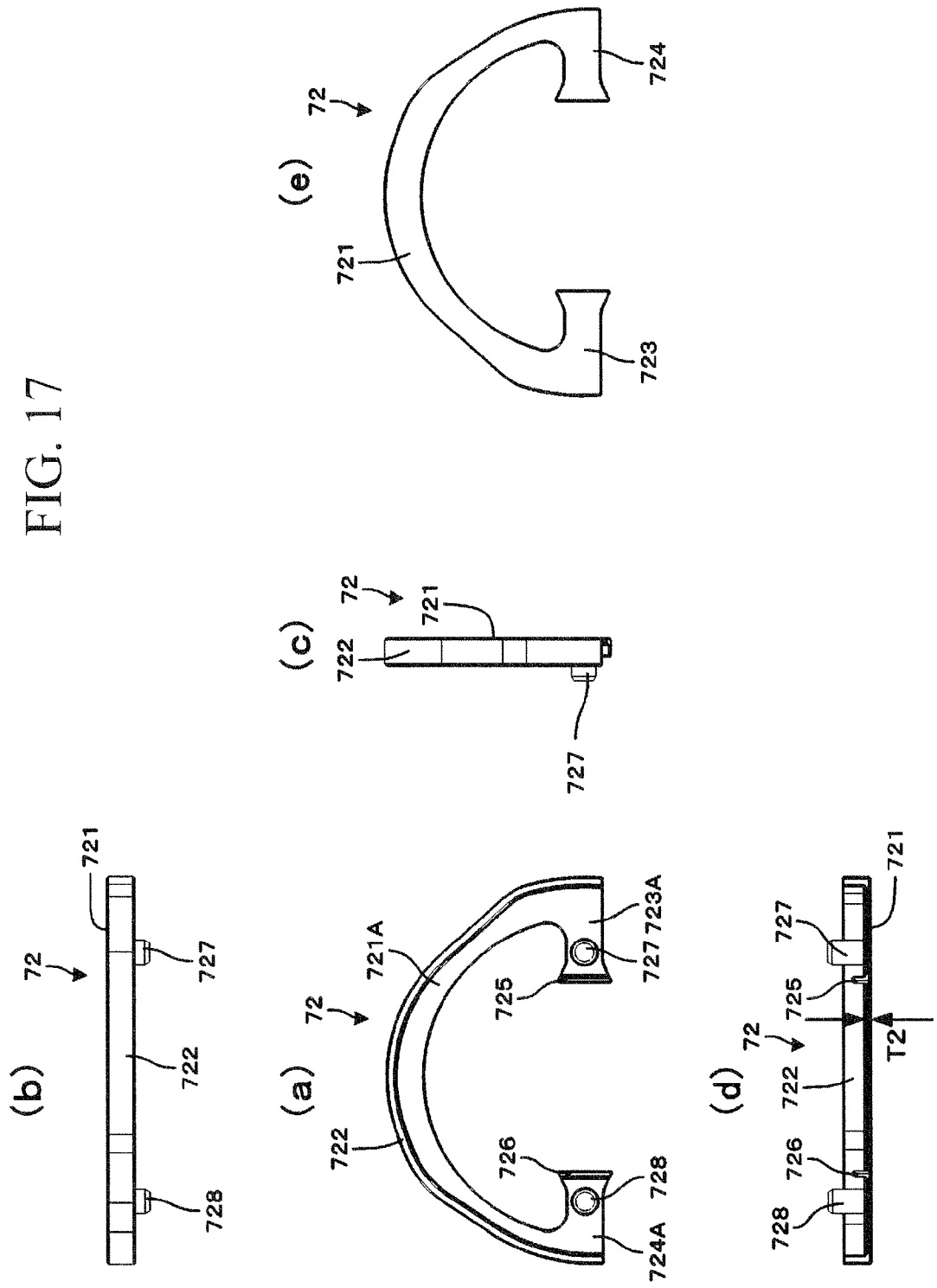

FIG. 16 is a perspective view illustrating the second buffer member 72 alone, in which FIG. 16(a) is a perspective view of the second buffer member 72 taken from a slide surface side, and FIG. 16(b) is a perspective view of the second buffer member 72 taken from a rear surface of the slide surface. FIG. 17 is a part view illustrating the second buffer member 72 alone, in which FIG. 17(a) is a front view of the second buffer member 72, FIG. 17(b) is a plan side view of FIG. 17(a), FIG. 17(c) is a right side view of FIG. 17(a), FIG. 17(d) is a lower surface view of FIG. 17(a), and FIG. 17(e) is a right side view of FIG. 17(c).

The first buffer member 71 illustrated in FIGS. 14 and 15, and the second buffer member 72 illustrated in FIGS. 16 and 17 are attached to an end surface 68 of the movable tilt lock gear 6 on the tilt stopper 5 side as illustrated in FIGS. 7 to 10. The second buffer member 72 is attached to an upper half of the periphery of the through hole 63 on the vehicle body upper side of the movable tilt lock gear 6. Also, the first buffer member 71 is attached to the vicinity of the gear 61 on the vehicle body lower side of the movable tilt lock gear 6. The first buffer member 71 and the second buffer member 72 are each made of a synthetic resin such as polyacetal (POM) which is excellent in a mechanical property and small in abrasion or friction coefficient.

The first buffer member 71 has sliding surfaces 711 and 712 flush with each other, and the sliding surface 711 is formed with a bent part 713 that is bent from the sliding surface 711 at a right angle. Also, a bent part 714 that is bent from the sliding surfaces 711 and 712 at a right angle is formed between the sliding surface 712 and the bent part 713. A bent part 715 that is bent from the bent part 714 at a right angle and is parallel to the sliding surfaces 711 and 712 is formed on a tip of the bent part 714. The sliding surface 712 is formed with an abutment surface 716 that is bent from the sliding surface 712 at a right angle, and a tip of the abutment surface 716 is formed with a bent part 717 that is bent from the abutment surface 716 at a right angle and is parallel to the sliding surface 712.

The first buffer member 71 pushes rear surfaces 711A and 712A of the sliding surfaces 711 and 712 toward an end surface 68 of the movable tilt lock gear 6 on the tilt stopper 5 side, and engages the bent parts 713, 714, and 715 with the movable tilt lock gear 6. Also, the first buffer member 71 pushes the abutment surface 716 toward the projection 62 of the movable tilt lock gear 6, and engages the bent part 717 with an end surface 621 of the projection 62. As a result, the first buffer member 71 is attached to the movable tilt lock gear 6 so as to prevent the movement within a plane parallel to a paper plane of FIG. 8(a), and the movement in a direction orthogonal to the paper plane of FIG. 8(a). The sliding surfaces 711 and 712 of the first buffer member 71 are projected toward the outer surface 241 side of the side plate 24 of the vehicle body attachment bracket 2 from the end surface 68 (sliding surface) of the movable tilt lock gear 6 by a thickness T1 of the first buffer member 71.

The second buffer member 72 has a semicircular sliding surface 721, and the sliding surface 721 is formed with a bent part 722 that is bent from an outer edge of the sliding surface 721 at a right angle. Also, a lower end (lower end of FIG. 17(e)) of the sliding surface 721 is formed with linear sliding surfaces 723 and 724 that extend from the lower end of the semicircular sliding surface 721 toward the center thereof. The tips of the sliding surfaces 723 and 724 are formed with bent parts 725 and 726 that are bent from the sliding surfaces 723 and 724 at a right angle.

Rear surfaces 723A and 724A of the sliding surfaces 723 and 724 are formed with columnar protrusions 727 and 728. A height H (refer to FIG. 16(b)) of the protrusions 727 and 728 is set to be larger than a gap between the sliding surface 721 of the second buffer member 72 and the outer surface 241 of the side plate 24 of the vehicle body attachment bracket 2 when the outer column 34 is unclamped from the vehicle body attachment bracket 2.

The second buffer member 72 pushes a rear surface 721A of the sliding surface 721 toward the end surface 68 of the movable tilt lock gear 6 on the tilt stopper 5 side, and engages the bent parts 726 and 727 with an inner peripheral surface of the through hole 63 of the movable tilt lock gear 6. Also, the columnar protrusions 727 and 728 of the second buffer member 72 are fitted into circular recesses (refer to FIG. 8(c) and FIG. 10(a)) 631, 631 of the movable tilt lock gear 6.

As a result, the second buffer member 72 is attached to the movable tilt lock gear 6 so as to prevent the movement within a plane parallel to the paper plane of FIG. 8(a), and the movement in a direction orthogonal to the paper plane of FIG. 8(a). The sliding surface 721 of the second buffer member 72 is projected toward the outer surface 241 side of the side plate 24 of the vehicle body attachment bracket 2 from the end surface 68 (sliding surface) of the movable tilt lock gear 6 by a thickness T2 of the second buffer member 72. In the embodiment of the present invention, the thickness T2 of the second buffer member 72 is set to be identical with the thickness T1 of the first buffer member 71.

Because the projection 62 of the movable tilt lock gear 6 is engaged with the recess 431 of the operating lever 43, when the operating lever 43 is rotationally operated counterclockwise, the movable tilt lock gear 6 is also rotated counterclockwise in synchronism with the rotating operation of the operating lever 43. Because the abutment surface 716 of the first buffer member 71 is abutted against the recess 431, an impact sound when the projection 62 and the recess 431 are abutted against each other is reduced when the operating lever 43 is rotationally operated.

The stationary cam 8 is not rotated because the planes 861 and 861 of the locking unit 86 of the stationary cam 8 are fitted into the tilt adjustment slender grooves 26 to regulate the rotation, and the movable tilt lock gear 6 and the wire spring 69 rotate together counterclockwise. Because the outer peripheral surfaces of the columnar protrusions 727 and 728 of the second buffer member 72 linearly contact the large-diameter outer peripheral surface 87 of the stationary cam 8 (refer to FIG. 8(c)), a contact between the metals is prevented, and the movable tilt lock gear 6 is smoothly rotated while being guided by the large-diameter outer peripheral surface 87 of the stationary cam 8.

When the movable tilt lock gear 6 is rotated, and the thread of the inclined cam surface of the movable cam 42 runs on the thread of the inclined cam surface 85 of the stationary cam 8, the fastening rod 41 is pulled toward the left side of FIG. 4, and the movable tilt lock gear 6 is pushed toward the outer surface 241 of the left side plate 24. Because the first buffer member 71 and the second buffer member 72 are attached to the movable tilt lock gear 6, the sliding surfaces 711 and 712 of the first buffer member 71 and the sliding surface 721 of the second buffer member 72 contact the outer surface 241 of the left side plate 24, and slide, and a contact between the metals is prevented to suppress the sliding sound.

Because the arm parts 691, 691 of the wire spring 69 slide while contacting the cylindrical outer peripheral surface 81 of the stationary cam 8, the center of the through hole 63 of the movable tilt lock gear 6 is held to the center of the stationary cam 8 by an urging force of the wire spring 69. Even if the outer column 34 is clamped to the vehicle body attachment bracket 2, the wire spring 69 does not receive the clamp force, and the arm parts 691, 691 of the wire spring 69 merely slide while contacting the outer peripheral surface 81 of the stationary cam 8 at a constant surface pressure. Also, since the wire spring 69 is subjected to a heat treatment, the hardness is high. For that reason, there is no risk that the durability of the wire spring 69 and the stationary cam 8 are deteriorated.

When the movable tilt lock gear 6 does not positionally match the stationary tilt lock gear 47 in the vertical direction of the vehicle body, and the thread of the gear 61 of the movable tilt lock gear 6 is abutted against the thread of the gear 471 of the stationary tilt lock gear 47, the arm parts 691, 691 of the wire spring 69 are elastically deformed by gaps (α1, α2) by its reaction force. Further, the tilt stopper 5 can suppress the backlash of the fastening rod 41 and the stationary cam 8. As a result, while the stationary cam 8 is fixed, the movable tilt lock gear 6 is slightly moved in the vertical direction of the vehicle body, and the gear 61 of the movable tilt lock gear 6 is normally engaged with the gear 471 of the stationary tilt lock gear 47. Accordingly, even if the driver smashes into the steering wheel during secondary collision, the column does not move in the tilt direction, and an air bag disposed in the steering wheel can receive an occupant at an effective position.

When the gear 61 of the movable tilt lock gear 6 is completely engaged with the gear 471 of the stationary tilt lock gear 47, an abutment surface (refer to FIGS. 6 and 19) 434 of the operating lever 43 is abutted against an end surface 478 of the stationary tilt lock gear 47 at the vehicle body front side to stop the operating lever 43. Because the operating lever 43 is made of a synthetic resin, an impact sound when the abutment surface 434 of the operating lever 43 is abutted against the end surface 478 of the stationary tilt lock gear 47 is reduced.

When the gear 61 of the movable tilt lock gear 6 is normally engaged with the gear 471 of the stationary tilt lock gear 47, the arm parts 691, 691 of the wire spring 69 move from the cylindrical outer peripheral surface 81 of the stationary cam 8 to the plane 83. As a result, because the arm parts 691, 691 urge the movable tilt lock gear 6 so as to rotate counterclockwise, the operating lever 43 is also urged so as to rotate counterclockwise, thereby producing the detent effect of the operating lever 43.

When the operating lever 43 is rotationally operated clockwise in order to unclamp the outer column 34 from the vehicle body attachment bracket 2, the movable tilt lock gear 6 is also rotated clockwise, and the gear 61 of the movable tilt lock gear 6 is disengaged from the gear 471 of the stationary tilt lock gear 47. Also, the thread of the inclined cam surface 85 of the stationary cam 8 is engaged with a valley of the inclined cam surface of the movable cam 42. Then, the axial positions of the stationary cam 8 and the movable cam 42 relatively approach each other, and the right side plate 25 of the vehicle body attachment bracket 2 is elastically returned in a direction opposite to the holding direction.

As a result, the outer column 34 is free (tilt unclamped) from the side plates 24 and 25 of the vehicle body attachment bracket 2. Also, the clamp members of the outer column 34 are elastically returned outwardly so that the inner surfaces of the clamp members are spaced apart from each other, and the width of the slit of the outer column 34 is widened. Accordingly, the inner peripheral surface of the outer column 34 is enlarged in diameter, and the outer peripheral surface of the inner column 31 is loosened for unclamping (telescopic unclamping).

In the tilt unclamped and telescopic unclamped states, the arm parts 691, 691 of the wire spring 69 move from the plane 83 of the stationary cam 8 to the cylindrical outer peripheral surface 81. As a result, the movable tilt lock gear 6 is slightly moved in the vertical direction of the vehicle body by the urging force of the wire spring 69, and the movable tilt lock gear 6 is easily disengaged from the stationary tilt lock gear 47. Thereafter, when the tilt unclamping and the telescopic unclamping are advanced, the center of the through hole 63 of the movable tilt lock gear 6 is returned to the center of the stationary cam 8.

In the tilt unclamped and telescopic unclamped states, while the tilt stopper 48, the outer column 34 is displaced in the tilt direction while the tilt stopper 5, and the locking unit 86 of the stationary cam 8 are guided to the tilt adjustment slender grooves 26 and 27 of the vehicle body attachment bracket 2, thereby enabling the steering wheel 103 to be arbitrarily adjusted in the tilt direction. When the arc surfaces 522, 522 of the tilt stopper 5 are abutted against the end of the tilt adjustment slender groove 26 at the tilt adjustment end, the arc surfaces 522, 522 are elastically deformed so that the impact at the tilt adjustment end can be reduced. Also, the outer column 34 is displaced along the outer peripheral surface of the inner column 31 in the telescopic direction while the telescopic adjustment slender groove of the outer column 34 is guided to the fastening rod 41, thereby enabling the steering wheel 103 to be arbitrarily adjusted in the telescopic direction.

When the tilt unclamping and the telescopic unclamping are conducted, the movable tilt lock gear 6 gets away from the outer surface 241 of the left side plate 24. When the outer column 34 is displaced in the tilt direction, and adjusted in the tilt direction, the end surface 68 of the movable tilt lock gear 6 is abutted against the outer surface 241 of the left side plate 24 by the impact during the tilt adjustment. However, the sliding surfaces 711 and 712 of the first buffer member 71, and the sliding surface 721 of the second buffer member 72 are abutted against the outer surface 241 of the left side plate 24, and spaced apart from the rotating center of the movable tilt lock gear 6. Therefore, the contact between the respective metals due to backlash is prevented to reduce the impact sound. Further, since the tilt stopper 5 suppresses the backlashes of the fastening rod 41 and the stationary cam 8, the impact sound can be reduced.

As described above, the height H (refer to FIG. 16(b)) of the columnar protrusions 727 and 728 of the second buffer member 72 is set to be larger than the gap between the sliding surface 721 of the second buffer member 72 and the outer surface 241 of the side plate 24 of the vehicle body attachment bracket 2 when the outer column 34 is unclamped from the vehicle body attachment bracket 2. Accordingly, even if the outer column 34 is unclamped from the vehicle body attachment bracket 2, there is no risk that the cylindrical protrusions 727 and 728 of the second buffer member 72 get away from the circular recesses 631, 631 of the movable tilt lock gear 6.

Figure 19:
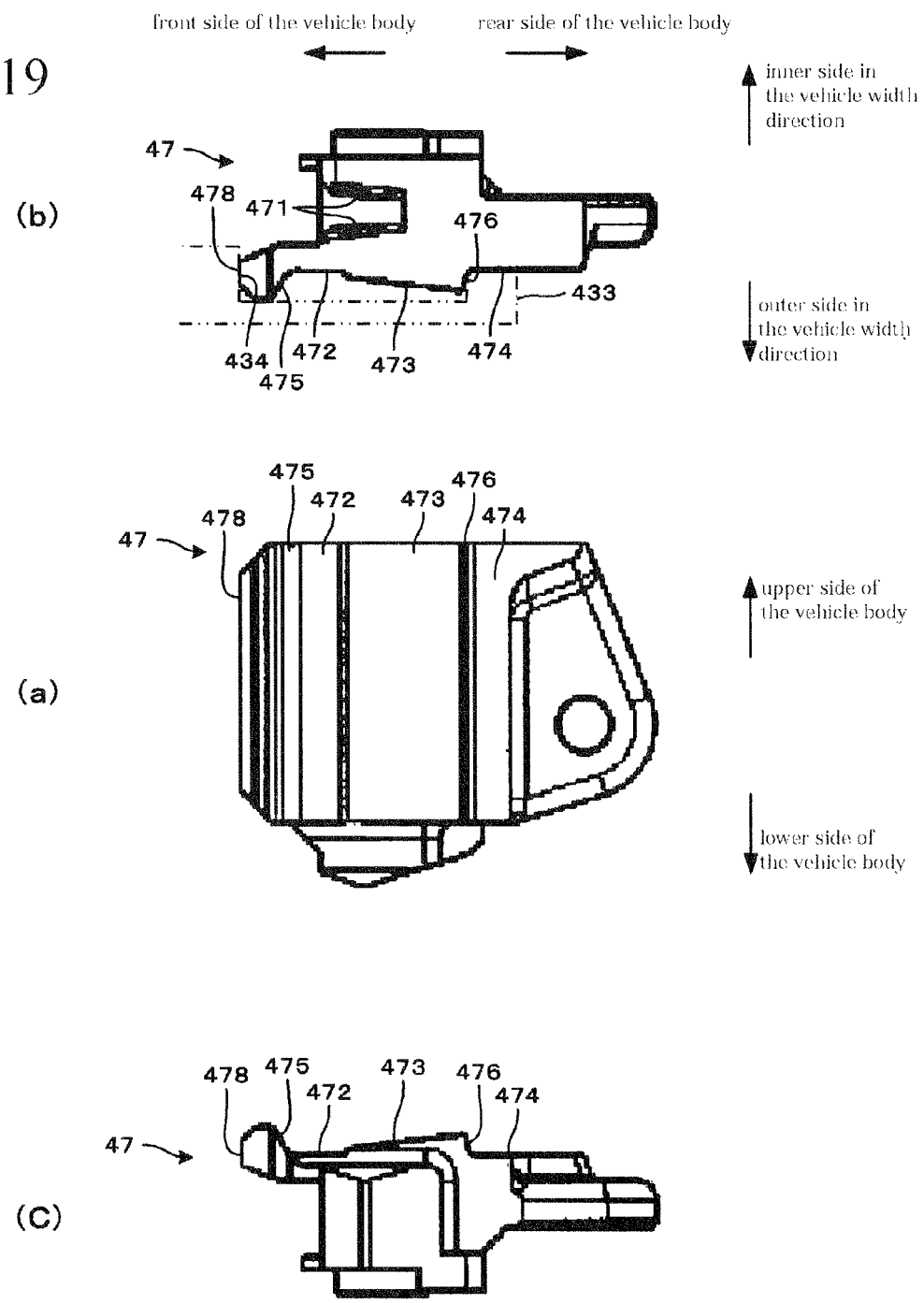

FIG. 18 is a perspective view illustrating the stationary tilt lock gear 47 alone, in which FIG. 18(a) is a perspective view of the stationary tilt lock gear 47 taken from an oblique lower side of an outside in a vehicle width direction, and FIG. 18(b) is a perspective view taken from a lower side lower than that FIG. 18(a). FIG. 19 is a part view illustrating the stationary tilt lock gear 47 alone, in which FIG. 19(a) is a front view of the stationary tilt lock gear 47, FIG. 19(b) is a plan side view of FIG. 19(a), and FIG. 19(c) is a lower surface view of FIG. 19(a).

Figure 20:
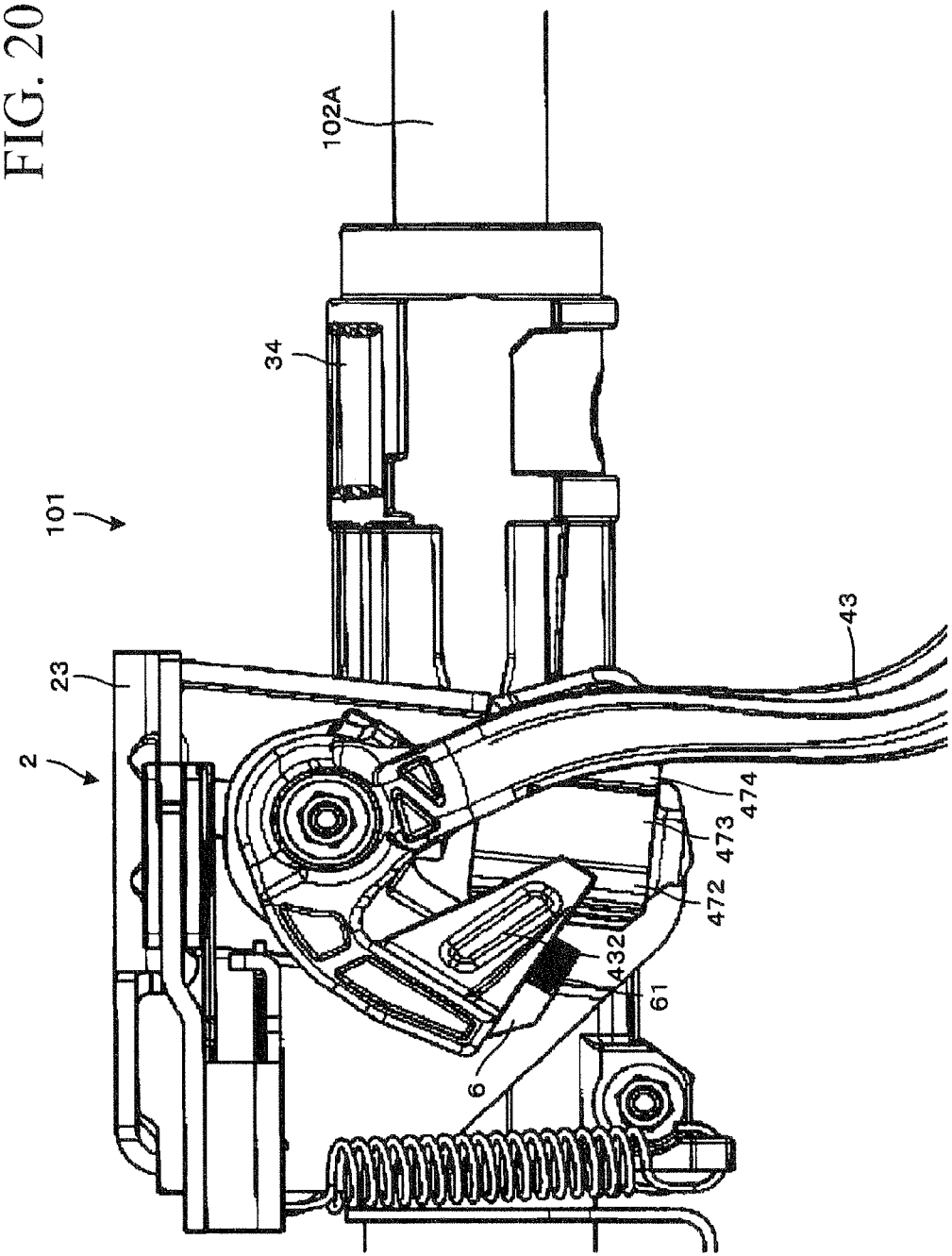
FIG. 20 is a front view of an operating lever neighborhood illustrating a state in which the operating lever is rotated clockwise to unclamp an outer column from the vehicle body attachment bracket.
Figure 21:
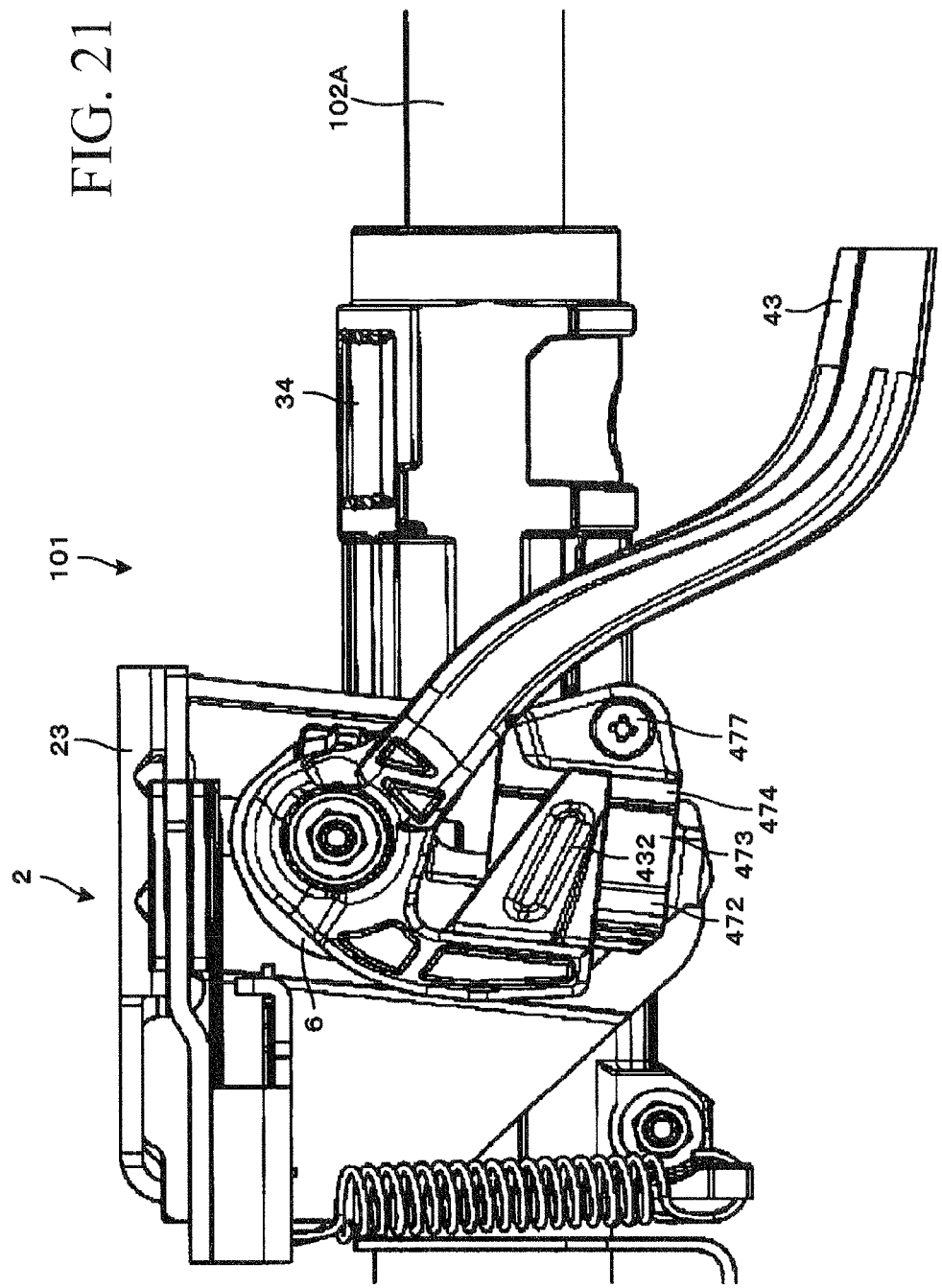
FIG. 21 is a front view of an operating lever neighborhood illustrating a state in which the operating lever is rotated clockwise to clamp the outer column to the vehicle body attachment bracket.

FIG. 20 is a front view of an operating lever 43 neighborhood illustrating a state in which the operating lever 43 is rotated clockwise to unclamp the outer column 34 from the vehicle body attachment bracket 2. FIG. 21 is a front view of an operating lever 43 neighborhood illustrating a state in which the operating lever 43 is rotated clockwise to clamp the outer column 34 to the vehicle body attachment bracket 2.

As illustrated in FIGS. 4 to 6, the operating lever 43 is formed with an engagement projection 433 at a tip of a thin-plate elastic deformation part 432. The elastic deformation part 432 is projected toward the outer surface 241 of the side plate 24. As illustrated in FIGS. 18 and 19, the outer surface of the stationary tilt lock gear 47 is formed with a sliding surface configured by a groove 472, an inclined surface 473, and a step 474. The engagement projection 433 slides while always contacting the sliding surface configured by the groove 472, the inclined surface 473, and the step 474 with the elastic deformation of the elastic deformation part 432, and always exerts an urging force outward in the vehicle width direction on the operating lever 43. Accordingly, the backlash of the operating lever 43 is removed, and the operational feeling of the operating lever 43 is improved.

The length of the groove 472, the inclined surface 473, and the step 474 in the vertical direction of the vehicle body (length in the vertical direction of FIG. 19(a)) is slightly longer than the tilt adjustment length of the outer column 34. The groove 472 is recessed in the inner side (upper side of FIG. 19(b)) of the vehicle front end (left end of FIG. 19(b)) of the inclined surface 473 in the vehicle direction, and is parallel to the outer surface 241 of the side plate 24. The length of the groove 472 in the longitudinal direction of the vehicle body (length in the lateral direction of FIG. 19(b)) is set to be slightly longer than the length of the engagement projection 433 in the longitudinal direction of the engagement projection 433. A wall 475 rising with a steep slope toward the outside in the vehicle width direction (lower side of FIG. 19(b)) is formed on the vehicle body front end of the groove 472.

The inclined surface 473 is formed to be higher with a gentle inclination toward the outside in the vehicle width direction toward the vehicle body rear side. The vehicle body rear end of the inclined surface 473 is formed with a steep slope 476 that drops with a steep slope toward the inside in the vehicle width direction (upper side of FIG. 19(b)), and is connected to the step 474. The step 474 is parallel to the outer surface 241 of the side plate 24, and the length of the step 474 in the longitudinal direction of the vehicle body (length in the lateral direction of FIG. 19(b)) is slightly longer than the length of the engagement projection 433 in the vehicle body longitudinal direction.

FIG. 20 is a front view of the operating lever 43 neighborhood illustrating a state in which the outer column 34 is unclamped from the vehicle body attachment bracket 2. As illustrated in FIG. 20, the engagement projection 433 is engaged with the groove 472 at the unclamp position. The groove 472 is held between the wall 475 and the vehicle body front end of the inclined surface 473, and is slightly longer than the tilt adjustment length of the outer column 34. For that reason, during the tilt adjustment of the outer column 34, the engagement projection 433 is moved while being guided by the groove 472, and the rotation of the operating lever 43 is regulated. Accordingly, the operating lever 43 is not jounced during the tilt adjustment, and when the movable tilt lock gear 6 is halfway engaged with the stationary tilt lock gear 47, in order to prevent abnormal noise from occurring during the tilt adjustment, the operating lever can be prevented from stopping on the way.

When the operating lever 43 is rotationally operated counterclockwise in order to clamp the outer column 34 to the vehicle body attachment bracket 2, the engagement projection 433 moves from the groove 472 to the inclined surface 473, and slides along the inclined surface 473. When the thread of the inclined cam surface 85 of the stationary cam 8 runs on the thread of the inclined cam surface of the movable cam 42, the operating force of the operating lever 43 becomes rapidly large, and the engagement projection 433 passes through the steep slope 476, and moves to the step 474. FIG. 21 is a front view of the operating lever 43 neighborhood illustrating a state in which the outer column 34 is clamped to the vehicle body attachment bracket 2.

Because the thread of the inclined cam surface 85 of the stationary cam 8 runs on the thread of the inclined cam surface of the movable cam 42, the outer column 34 is strongly held between the left side plate 24 and the right side plate 25, and at the same time, the movable tilt lock gear 6 is engaged with the stationary tilt lock gear 47 to complete the clamping operation.

When the operating lever 43 is rotationally operated clockwise, the movable tilt lock gear 6 is also rotated clockwise, and the movable tilt lock gear 6 and the stationary tilt lock gear 47 are disengaged from each other. Also, the thread of the inclined cam surface 85 of the stationary cam 8 is engaged with the valley of the inclined cam surface of the movable cam 42, and the outer column 34 is free (tilt unclamped) from the side plates 24 and 25 of the vehicle body attachment bracket 2.

In the above embodiment, the description is given of a case in which the present invention is applied to the steering device of the tilt and telescopic type that can perform both of the tilt position adjustment and the telescopic position adjustment. Alternatively, the present invention may be applied to a steering device of the tilt type that can perform only the tilt position adjustment.

Description of Reference Symbols 101, steering device 102, steering shaft
102A, upper steering shaft
103, steering wheel
104, universal joint
105, intermediate shaft
106, universal joint
107, steering gear
108, tie rod
2, vehicle body attachment bracket
22, capsule
23, upper plate
24, side plate
241, outer surface
242, inner surface
243, rib
25, side plate
251, outer surface
252, inner surface
253, gap
26, 27, tilt adjustment slender groove
31, inner column
32, steering assist unit
321, electric motor
322, reduction gear box unit
323, output shaft
33, bracket
34, outer column
41, fastening rod
411, disc-shaped head
412, rectangular locking unit
42, movable cam
43, operating lever
431, recess
432, elastic deformation part
433, engagement projection
434, abutment surface
44, collar
45, thrust bearing
46, nut
47, stationary tilt lock gear
471, gear
472, groove
473, inclined surface
474, step
475, wall
476, steep slope
477, bolt
478, end surface
48, tilt stopper
5, tilt stopper
51, cylindrical part
52, flange part
521, plane
522, arc surface
523, right end surface
524, left end surface
53, through hole
54, slit
55, engagement projection
551, inclined surface
552, engagement surface
56, arc groove
57, arc recess surface
58, line
6, movable tilt lock gear
61, gear
62, projection
621, end surface
63, through hole
631, recesses
64, engagement projection
65, 66, engagement recess
67, end surface
68, end surface
69, wire spring (spring)
691, arm part
692, 693, bent part
694, connecting part
695, arc part
71, first buffer member
711, 712, sliding surface
711A, 712A, rear surface
713, 714, 715, bent part
716, abutment surface
717, bent part
72, second buffer member
721, sliding surface
721A, rear surface
722, bent part
723, 724, sliding surface
723A, 724A, rear surface
725, 726, bent part
727, 728, protrusion
8, stationary cam
81, outer peripheral surface
82, inclined surface
83, plane
84, through hole
85, inclined cam surface
86, locking unit
861, plane
862, arc surface
87, large-diameter outer peripheral surface
88, end surface
89, line (axis of symmetry)

What is claimed is:

1. A steering device, comprising:
a vehicle body attachment bracket that can be attached to a vehicle body;
a column that is supported by the vehicle body attachment bracket so that a tilt position is adjustable, and rotatably pivotally supports a steering shaft equipped with a steering wheel;
a fastening rod that is inserted into a tilt adjustment slender groove formed in the vehicle body attachment bracket and the column in order to fasten the column to the vehicle body attachment bracket at a desired tilt position;
a stationary cam that is supported by one end of the fastening rod, and presses one side of the vehicle body attachment bracket toward the column;
a movable cam that is rotatably supported by said one end of the fastening rod together with an operating lever so as to face the stationary cam;
a cam surface that is disposed on respective surfaces that face the stationary cam and the movable cam, and presses the movable cam toward the stationary cam relatively in an axial direction;
a locking unit that is formed in the stationary cam in order to disable the stationary cam to be relatively rotated with respect to the movable cam, fitted into the tilt adjustment slender groove, and can slide along the tilt adjustment slender groove when adjusting the tilt position of the column;

a stationary tilt lock gear formed on one side of the vehicle body attachment bracket;

a movable tilt lock gear that rotates in synchronism with rotating operation of the operating lever, can be engaged with the stationary tilt lock gear, and is fitted onto the stationary cam so as to be movable in a tilt direction;

a spring that is inserted between the movable tilt lock gear and the stationary cam, and elastically supports movement of the movable tilt lock gear to the stationary cam in the tilt direction; and a tilt stopper that holds the stationary cam, the movable tilt lock gear, and the spring integrally.

2. The steering device according to claim 1, wherein the tilt stopper is fitted into the tilt adjustment slender groove, is slidable along the tilt adjustment slender groove when adjusting the tilt position of the column, and abuts against an end of the tilt adjustment slender groove at the tilt adjustment end to reduce an impact.

3. The steering device according to claim 2, wherein the tilt stopper comprises:

a flange that is fitted into the tilt adjustment slender groove, and is slidable along the tilt adjustment slender groove when adjusting the tilt position of the column; and a space part that is formed in the vicinity of an end surface of the flange in the tilt adjustment direction, and reduces the impact when the flange is abutted against the tilt adjustment end of the tilt adjustment slender groove.

4. The steering device according to claim 3, wherein the tilt stopper comprises:

a cylinder part that is formed integrally with the flange, and fitted into a through hole formed in an axial core of the stationary cam;

an engagement projection that is formed on an end of the cylindrical part, projects outwardly from an outer peripheral surface of the cylindrical part in a radial direction thereof, and is engageable with an end surface of a cam surface side of the stationary cam; and a through hole that is formed in the axial core of the cylindrical part, into which the fastening rod is inserted, wherein the stationary cam, the movable tilt lock gear, and the spring are held between the end surface of the flange and the engagement projection integrally.

5. The steering device according to claim 1, wherein the tilt stopper is symmetric with respect to a line that passes through the center of the tilt stopper as the axis of symmetry.

* * * * *